United States Patent [19]
Dean et al.

[11] Patent Number: 6,098,097
[45] Date of Patent: Aug. 1, 2000

[54] CONTROLLING THE INSTALLATION AND CONFIGURATION OF PROGRAMS AND COMPONENTS IN A NETWORK OF SERVER AND CLIENT COMPUTERS THROUGH ENTRIES INTO A PRIMARY SERVER COMPUTER

[75] Inventors: Jeffrey Randell Dean; Jeffrey Langdon Howard; Ingrid Milagros Rodriguez, all of Austin, Tex.

[73] Assignee: International Business Machines Corporation, Armonk, N.Y.

[21] Appl. No.: 09/078,966

[22] Filed: May 14, 1998

[51] Int. Cl.$^7$ ........................................... G06F 13/00
[52] U.S. Cl. ................................................ 709/220
[58] Field of Search ........................... 709/100, 200, 709/201, 203, 208, 209, 218, 219, 220, 221, 222, 223

[56] References Cited

U.S. PATENT DOCUMENTS 5,367,686   11/1994   Fisher et al. ............................. 395/700
5,394,522   2/1995    Sanchez-Frank et al. ............... 709/220

*Primary Examiner*—Robert B. Harrell
*Attorney, Agent, or Firm*—J. B. Kraft; Leslie A. VanLeevwen

[57] ABSTRACT

A method for the configuration of a network made up of server and client computers is provided, which involves the setting of a primary server having an interactive display and the installation of all of the application programs and the driver programs, which may be required to support internal and external components of all of the other server and client computers in the network which is controlled through entries to the interactive display interface of said primary server computer. Similarly, the operating system installation for the server and client computers may be controlled through entries to this primary server computer interface. Also, adapters required by the other server and client computers to support various components are selected through entries made through the interface to the primary server computer.

20 Claims, 29 Drawing Sheets

Reviewing the profile summary

Examine the profile. Click the PLUS SIGN (+) to expand an item; click the MINUS SIGN (-) to collapse it. Click a name in the tree to display its attributes. All columns can be resized by dragging their borders.

| Attribute | Value |
|---|---|
| Company Name | Paco's Repair Shop |
| Contact Name | Paco Rodriguez |
| Contact's Job Role | Owner |
| Number of Servers | 1 |
| Number of Clients | 3 |
| Same OS Among Clients | Yes |
| Same Server App Config | Yes |
| Same Client App Config | Yes |
| Bitmap File | C:\Program Files\Ins. |
| Domain Name | PILOTDM |
| Use DHCP | No |
| Subnet Mask | 255.255.255.0 |
| Default Gateway | 0.0.0.0 |

- (-) Customer Profile
  - (-) PILOT
    - Lotus Domino Intranet Starter Pack
    - Netscape Navigator 3.01
    - IBM DB2 Server 21.2
  - (-) PACO
    - Microsoft Office 97 Professional Edition
    - QuickBooks Pro 5.0 by Intuit
  - (-) NEWTON
    - Microsoft Office 97 Professional Edition
    - QuickBooks Pro 5.0 by Intuit
  - (-) PILOT
    - Microsoft Office 97 Professional Edition
    - QuickBooks Pro 5.0 by Intuit

[<Back] [Next>] [Cancel] [Help]

FIG. 22

CONTROLLING THE INSTALLATION AND CONFIGURATION OF PROGRAMS AND COMPONENTS IN A NETWORK OF SERVER AND CLIENT COMPUTERS THROUGH ENTRIES INTO A PRIMARY SERVER COMPUTER

CROSS-REFERENCE TO RELATED COPENDING PATENT APPLICATIONS

The following patent applications, which are assigned to the assignee of the present invention and filed concurrently herewith, cover subject matter related to the subject matter of the present invention: "A STORED FILE OF PRERECORDED KEYSTROKES AND CURSOR SELECTIONS FOR CONTROLLING AUTOMATIC INSTALLATION AND CONFIGURATION OF PROGRAMS AND COMPONENTS IN A NETWORK OF SERVER AND CLIENT COMPUTERS", Bezanson, Chuang and Rodriguez (Attorney Docket No. AT9-98-195); Ser. No. 09/078,934; and "SIMULTANEOUS INSTALLATION AND CONFIGURATION OF PROGRAMS AND COMPONENTS INTO A NETWORK OF SERVER AND CLIENT COMPUTERS, Dean, Howard and Rodriguez (Attorney Docket No. AT9-98-196) Ser. No. 09/078,965.

TECHNICAL FIELD

The present invention relates to a method and program for the configuration of a computer network and particularly a local network of server computers and client computers or the modification of the configuration of such a network in a manner which is expeditious and involves very little down-time of the network or its components.

BACKGROUND OF THE INVENTION

Computers and their application programs are used in all aspects of business, industry and academic endeavors. In recent years, there has been a technological revolution driven by the convergence of the data processing industry with the consumer electronics industry. This advance has been even further accelerated by the extensive consumer and business involvement in the Internet in recent years. As a result of these changes, it seems as if virtually all aspects of human productivity in the industrialized world requires human/computer interaction. The computer industry has been a force for bringing about great increases in business and industrial productivity. Almost every week seems to bring computer industry advances which promise even further increases in productivity. These advances offer to drive down business and industry costs and increase efficiency in addition to increasing productivity. In addition, the cost of "computer power" continues to drop as result of rapid advances in computer related technologies.

Despite all of these advantages, there still remains great resistance in all industries and business fields to new computer systems and significant system upgrades which offer much in productivity increases. This resistance results from past experience which equates installing new computer systems or significant upgrades in existing systems with large amounts of down-time, during which the business, manufacturing facility or individual worker functions are inoperative or operate at diminished levels. When a business or production facility is trying to decide whether to install a new or significantly upgraded computer system, the concern about down-time, the possible loss of business as well as stress on the workers involved very often outweighs the cost of the installation in influencing the decision. The concern about business and production delays resulting from installation has become so great that fewer and fewer small businesses are trying to make system and program changes on their own. The professional computer service industry which carries out and supports installations and upgrades for the business and industrial sector has been rapidly expanding over the past decade. However, even with such computer professional support, the threat of such down-time coupled with the costs of such professional services caused by installation delays remains of great concern.

SUMMARY OF THE INVENTION

The present invention, together with the above cross-referenced patent applications, provides solutions which are directed to minimizing the time required for installation and configuration, as well as the significant upgrading of networks made up of a plurality of server computers having groups of client computers connected to each server computer. These inventions further minimize the number of computers in the network which have to be involved in each stage of an installation to thereby permit some of the system to remain functional for as long as possible during an upgrade. The present invention involves predetermining the internal and external components, and the application programs to be supported by each of the server and client computers in the network and the interconnections between said server and client computers. One server computer having an interactive display interface is designated to function as the primary server computer, and the installation of all of the application programs and the driver programs which may be required to support said internal and external components of all of the other server and client computers in the network is then controlled through entries to the interactive display interface of said primary server computer. Similarly, the operating system installation for the server and client computers may be controlled through entries to this primary server computer interface. Also, adapters required by the other server and client computers to support various components are selected through entries made through the interface to the primary server computer. This includes network adapters selected in the configuration of the network. Likewise, other settings needed to configure the network or the individual server or client computers in the network are made through entries to this primary server computer. In this manner, all application and driver programs for all of the computers in the network are installed through the interface to the primary server computer.

In accordance with a more particular aspect of the present invention, if the same programs are to be installed on a plurality of computers at either the server level or client level, the entries needed for installation may be made concurrently to the primary server computer. With respect to the above cross-referenced patent applications, the copending Bezanson et al. application covers the recorded file of all of the keystrokes and cursor selections made on the primary server in the installation of the programs, settings and configurations, and the Dean et al. application covers the subsequent automatic installation of the programs, settings and configurations for the entire network of computers using such file of prerecorded keystrokes and cursor selections, as well as all of the programs which have been preinstalled into the primary server computer. With such an overall procedure, most of the remaining computers in the network are free to continue to function during the time that all of the programs are being setup and preinstalled into the primary server computer. Also with such an arrangement, all of the problems should have been solved during the preliminary entry into the primary server computer so that the subsequent installation into the computers in the rest of the network should run smoothly and quickly.

BRIEF DESCRIPTION OF THE DRAWINGS

FIG. 22 is a diagrammatic view of an interactive dialog screen on the primary server to present to the viewer all of the data entries made to the primary server as the stored profile of the whole network configuration;

DETAILED DESCRIPTION OF THE PREFERRED EMBODIMENT

Before going into the details of specific embodiments, it will be helpful to understand from a more general perspective the various elements and methods which may be related to the present invention as covered in the above-referenced copending Bezanson et al. and Dean et al. patent applications. The present and copending applications are all directed to the goal of accomplishing all network installations, configurations or settings, whether these be new networks or reconfigured networks, by designating a primary network server computer and then making all significant setup installations and settings to all of the other server computers and client computers in the network through and under the control of the primary server computer. This will result in a substantial time savings and computer resource savings in configuring and installing on networks. Since all of the entries are made through the primary server, no other computer resources are tied up during the entry period. Also, to some practical degree, many of the installations and settings which are the same for a plurality of computers in the network may be made by simultaneous or single sets of entries covering the same entries or installations on the plurality of computers.

Accordingly, the present application covers the general concept of making all of the entries and installations for all of the computers in the network through a primary server. The copending Bezanson et al. application covers the recorded and stored profile of all of the keystroke and cursor selection entries made into the primary server, which profile is subsequently used to control the configuration of the network, installations and settings on all of the computers in the network, and the copending Dean et al. application automatically and, wherever possible, simultaneously configuring the network and making all installations and settings on all of the computers in the network via the primary server computer based upon the previously recorded stored profile with application programs which have been previously loaded into the primary server computer for distribution during this automatic network configuration.

Figure 1:
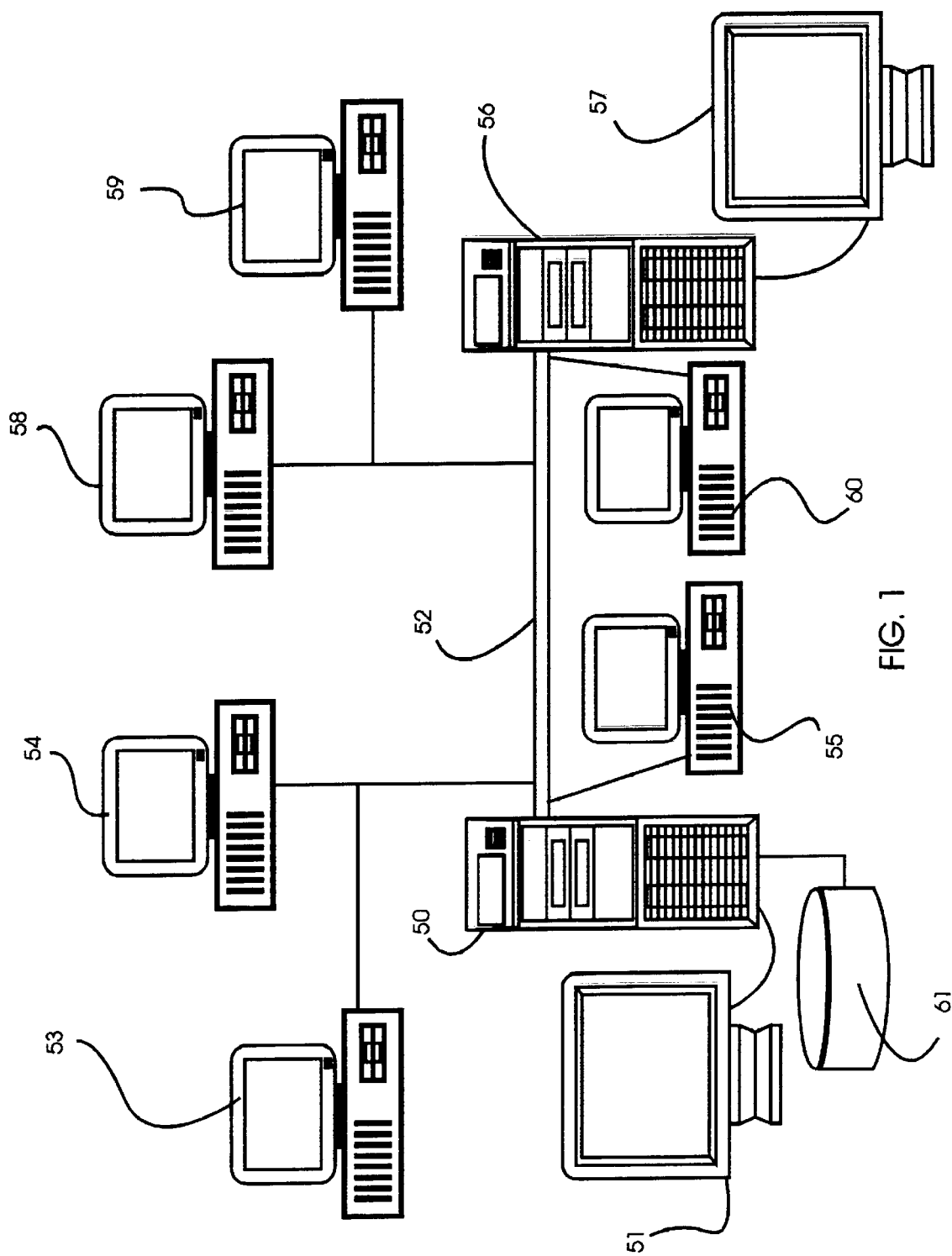
FIG. 1 is a generalized diagrammatic view of a network of server and client computers which may be configured according to the present invention.

With reference to FIG. 1 there is shown a representative diagram of a local network 52 upon which the present invention may be illustrated. There are two server computers 50 and 56 of which server 50 is to function as the primary server. Each server respectively has a plurality of client computers: clients 51, 53 and 54 are served by primary server 50, while server 56 serves clients 58, 59 and 60. As will be subsequently described with respect to FIGS. 3 through 27, all configuration entries and settings are made into and stored in primary server 50 through its display interface 51. All programs for the network and for the computers in the network are also loaded into server 50 and stored for subsequent installation. Storage facility 61 is a diagrammatic representation of this primary server storage capability.

Figure 2:
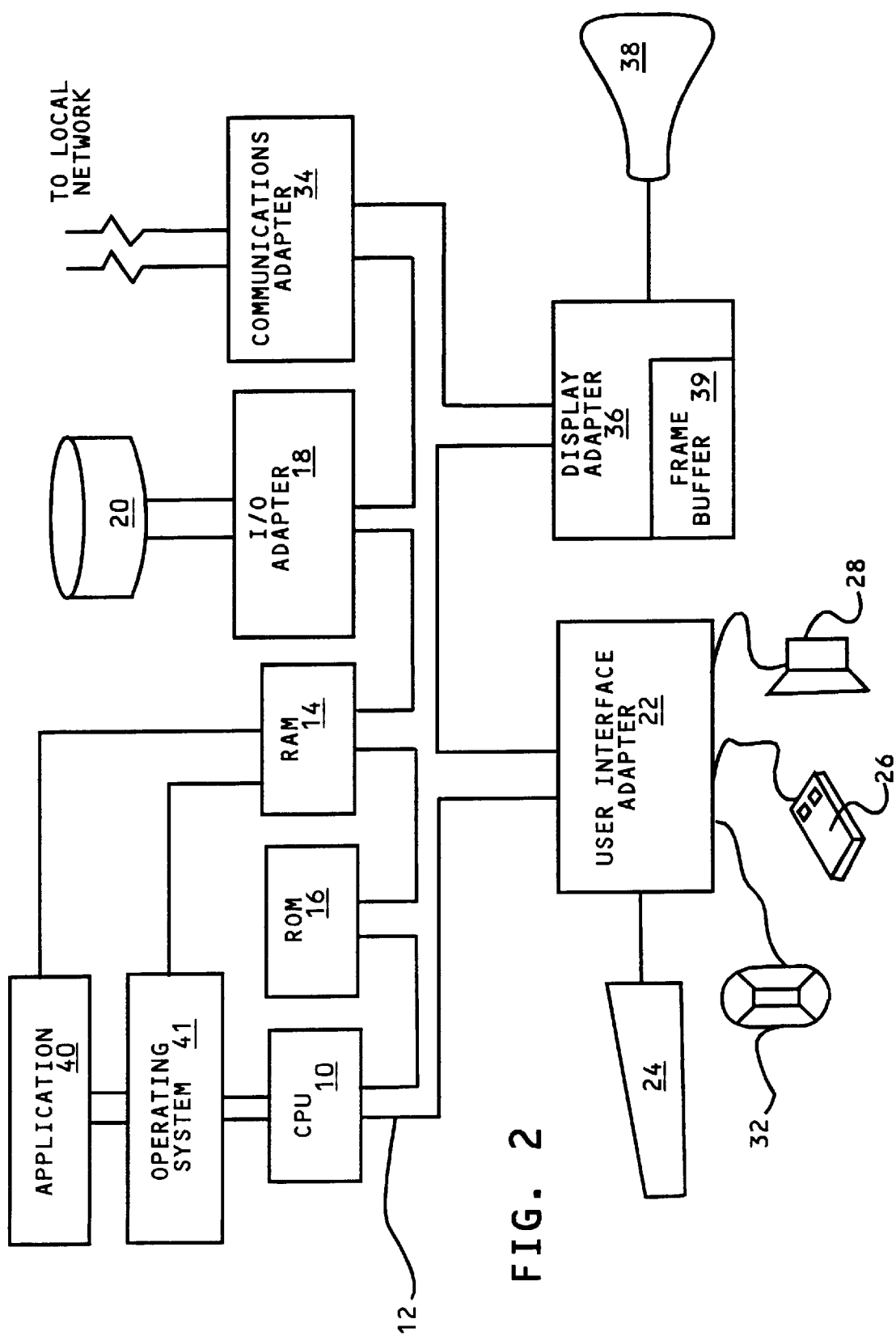
FIG. 2 is a block diagram of an interactive data processor controlled work station display system including a central processing unit which is capable of serving as the primary server of this invention.

FIG. 2 is a diagram of a display interface workstation which can function as the primary server 50. A central processing unit (CPU), such as in one of the PC Server series of workstations available from International Business Machines Corporation, or the Poweredge 2200 ("Poweredge 2200" is a trademark of Dell Corporation) server from Dell Corporation is provided and interconnected to various other components by system bus 12. An operating system 41 runs on CPU 10 and provides control and is used to coordinate the function of the various components of FIG. 2. Operating system 41 may be one of the commercially available operating systems such as Microsoft's Windows NT(™), the OS/2 ("OS/2" is a trademark of International Business Machines Corporation) operating system available from International Business Machines Corporation, Microsoft Windows 95(™), as well as UNIX or AIX operating systems. The programming application for controlling all of the entries and installations to be subsequently described for FIGS. 3 through 27, application 40, runs in conjunction with operating system 41 and provides output calls to the operating system 41 which implement the various functions to be performed by the application 40. A read only memory (ROM) 16 is connected to CPU 10 via bus 12 and includes the basic input/output system (BIOS) that controls the basic computer functions. Random access memory (RAM) 14, which will provide for a portion of the basic storage of entries to be subsequently described, I/O adapter 18 and communications adapter 34 are also interconnected to system bus 12. It should be noted that software components, including the operating system 41 and the application 40, are loaded into RAM 14 which is the computer system's main memory. I/O adapter 18 conventionally communicates with the disk storage device 20, i.e. a hard drive which may also be involved in the subsequently described storage. Communications adapter 34 interconnects bus 12 with the rest of the local network described in FIG. 1 enabling the data processing system to communicate with its client computers, as well as other servers and client computers to control entry configurations and installations to be subsequently described. I/O devices are also connected to system bus 12 via user interface adapter 22 and display adapter 36. Keyboard 24, trackball 32, mouse 26 and speaker 28 are all interconnected to bus 12 through user interface adapter 22. It is through such input devices that the user interactive functions involved in the present invention may be implemented. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38.

There will now be described a simple illustration of the present invention with respect to the display screens of FIGS. 3 through 27. When the screen images are described it will be understood that these may be rendered by storing an image and text creation programs, such as those in any conventional window operating system in the RAM 14 of the system of FIG. 2. The operating system is diagrammatically shown in FIG. 2 as operating system 41. Display screen images are presented to the viewer on display monitor 38 of FIG. 2. In accordance with conventional techniques, the user may control the screen interactively through a conventional I/O device, such as mouse 26 of FIG. 2 which operates through user interface 22 to call upon programs in RAM 14 cooperating with the operating system 41 to create the images in frame buffer 39 of display adapter 36 to control the display on monitor 38.

Figure 3:
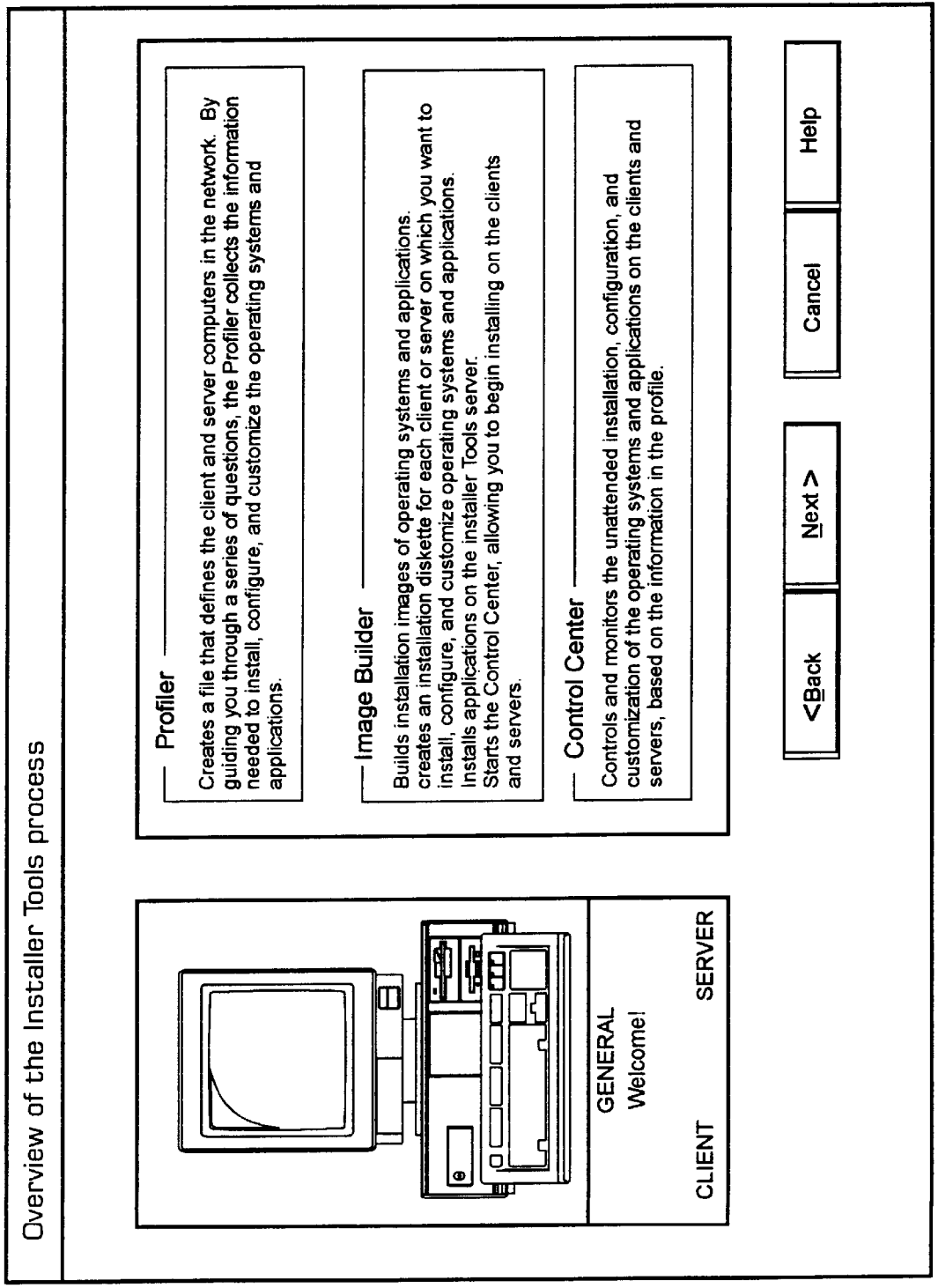
FIG. 3 is a diagrammatic view of an interactive dialog screen on the primary server setting forth the installation tools available to the installer.
Figure 4:
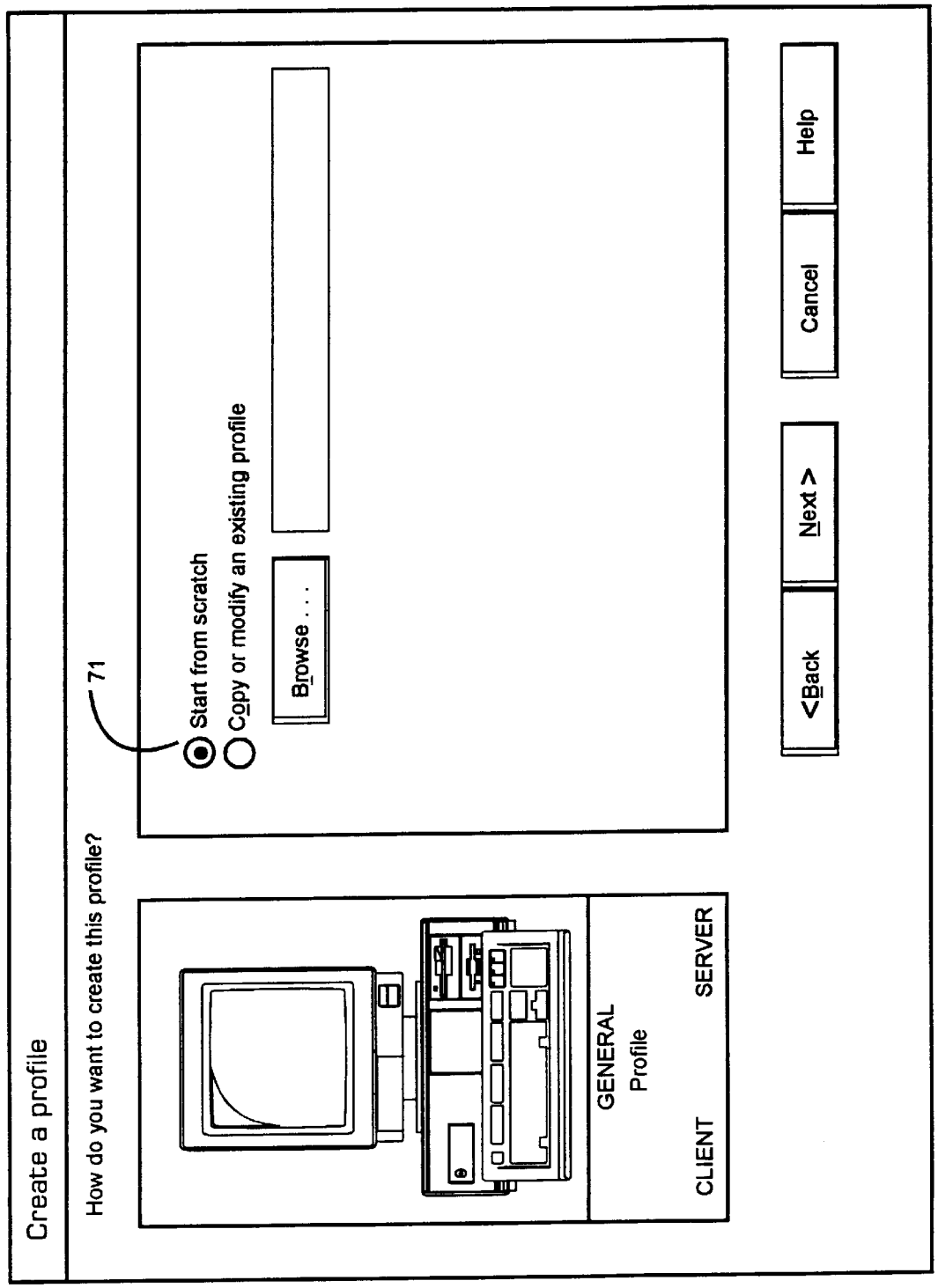
FIG. 4 is a diagrammatic view of an interactive dialog screen on the primary server for the entry of a decision if the change is an update or an entirely new configuration.
Figure 5:
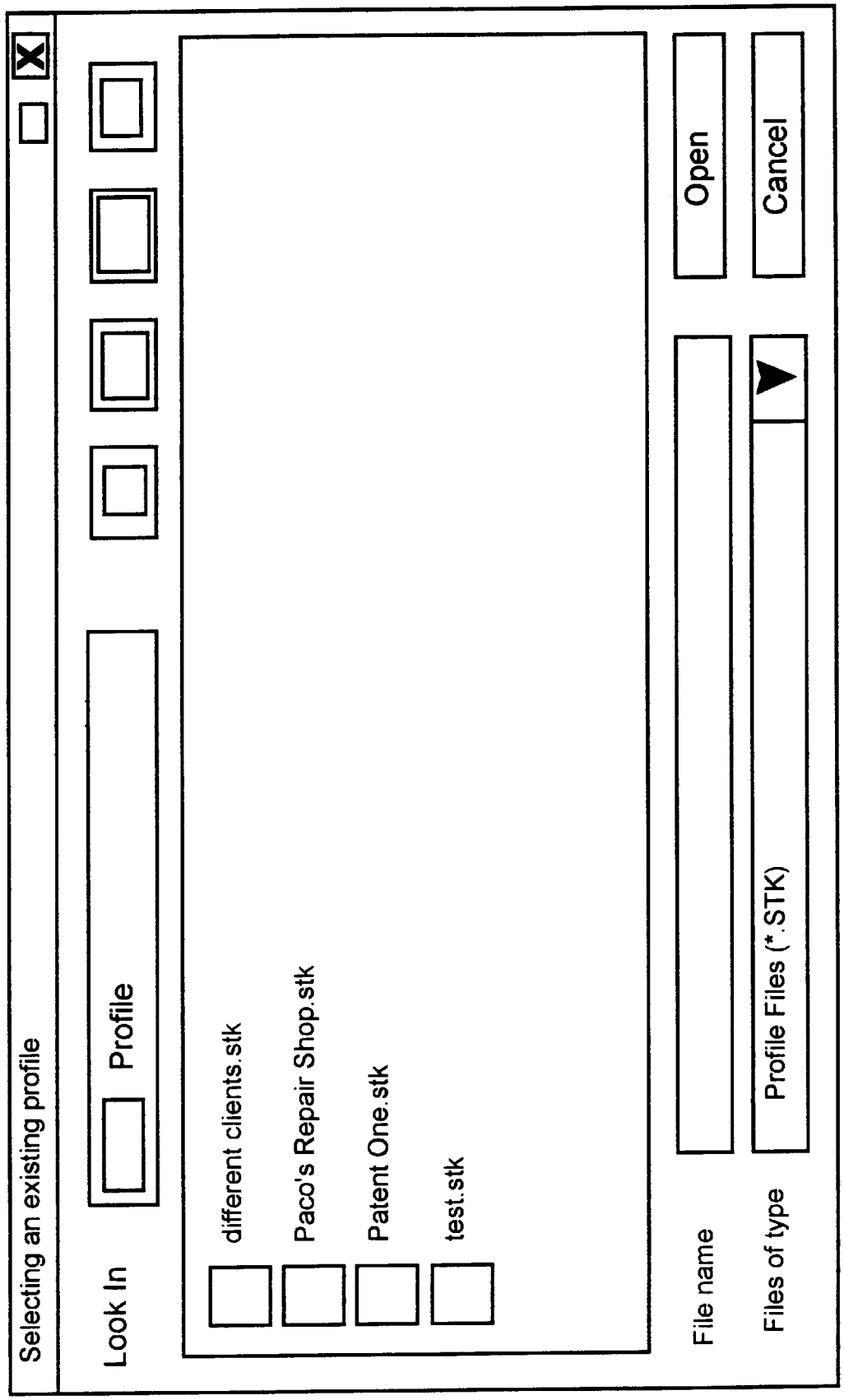
FIG. 5 is a diagrammatic view of an interactive dialog screen on the primary server for the initial entry of an update.
Figure 6:
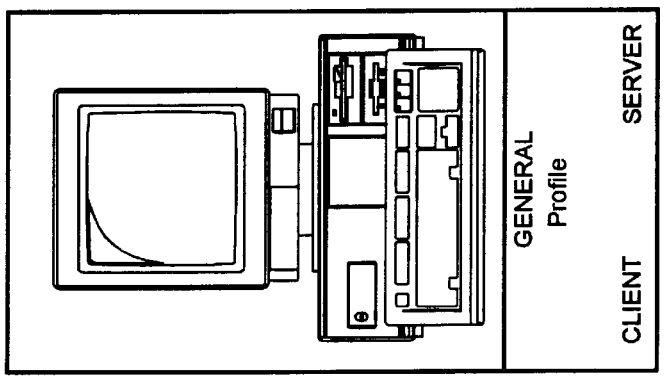
FIG. 6 is a diagrammatic view of an interactive dialog screen on the primary server for the initial entry of a new configuration.
Figure 7:
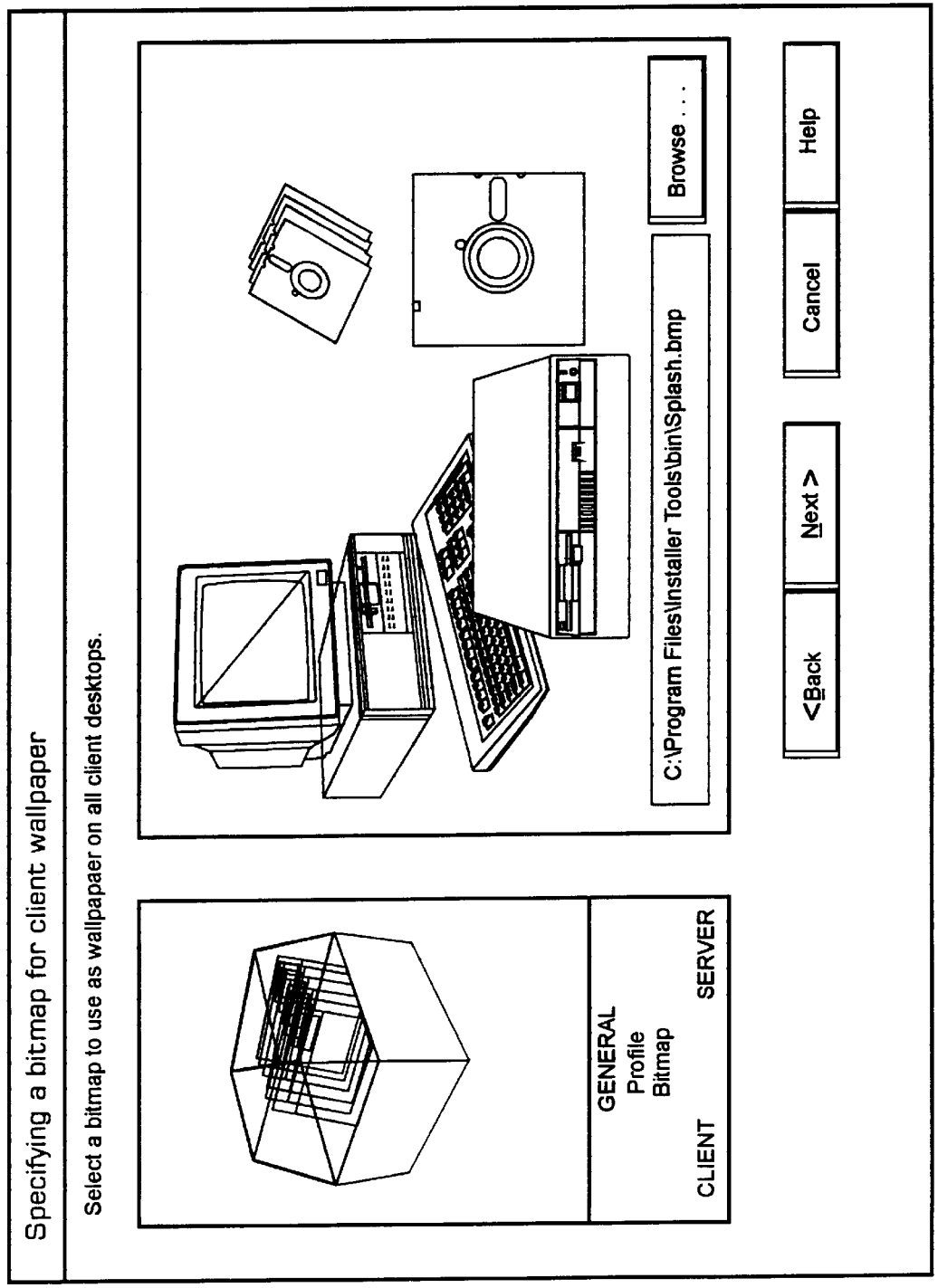
FIG. 7 is a diagrammatic view of an interactive dialog screen on the primary server for the entry of an overall setting.
Figure 8:
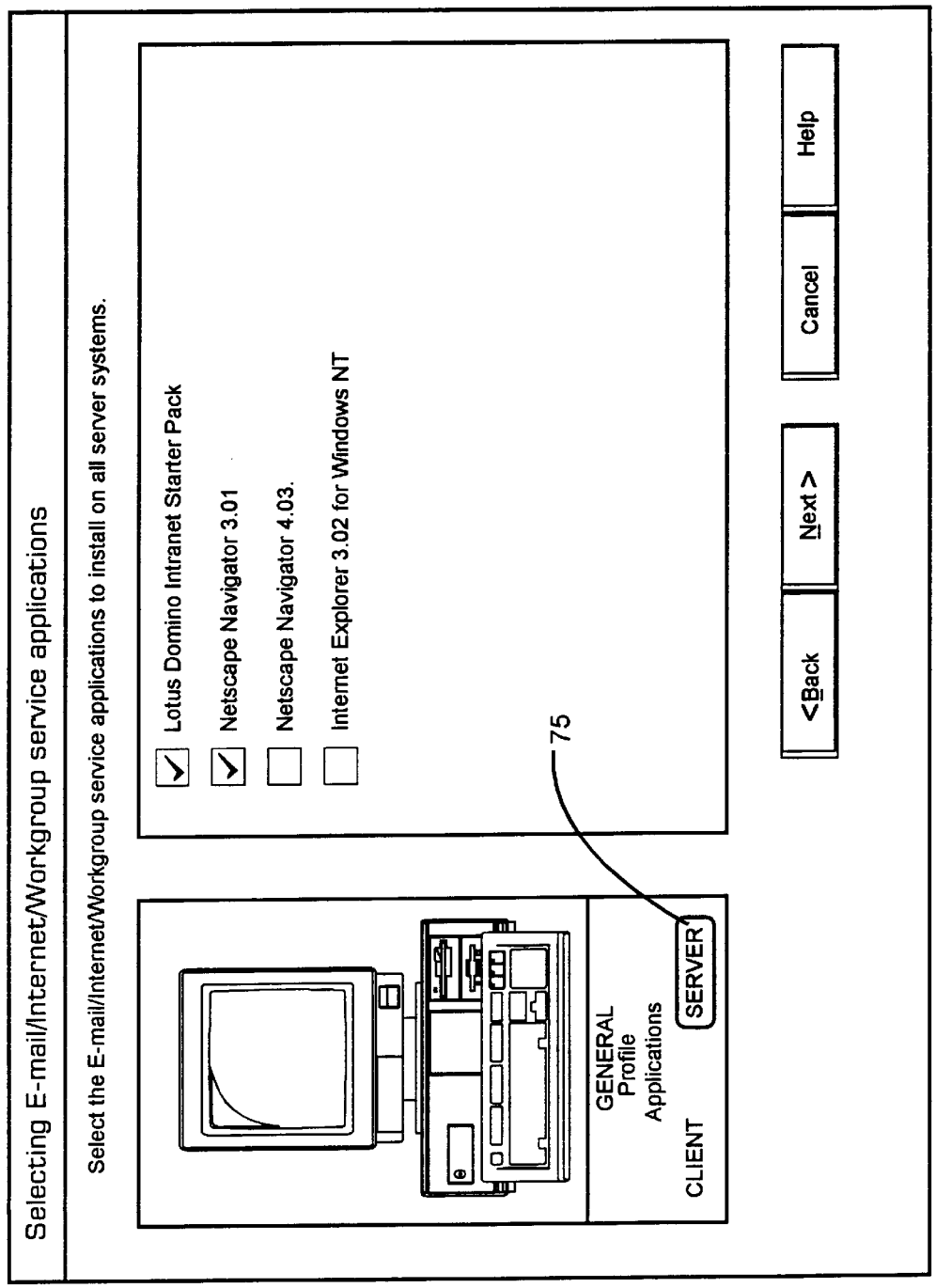
FIG. 8 is a diagrammatic view of an interactive dialog screen on the primary server for the entry choosing programming applications for the servers.
Figure 9:
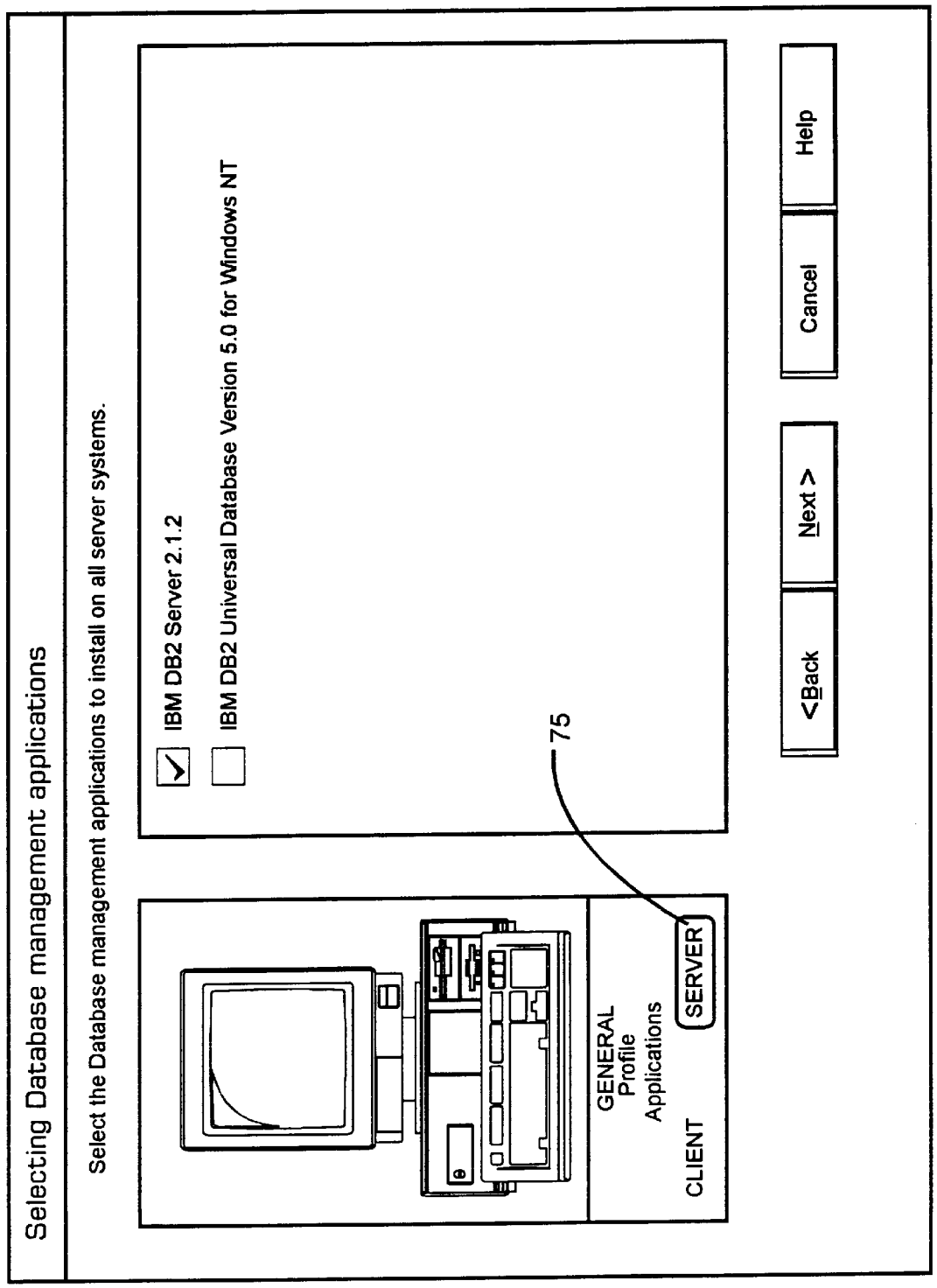
FIG. 9 is a diagrammatic view of an interactive dialog screen on the primary server for the entry choosing database management applications for the servers.
Figure 10:
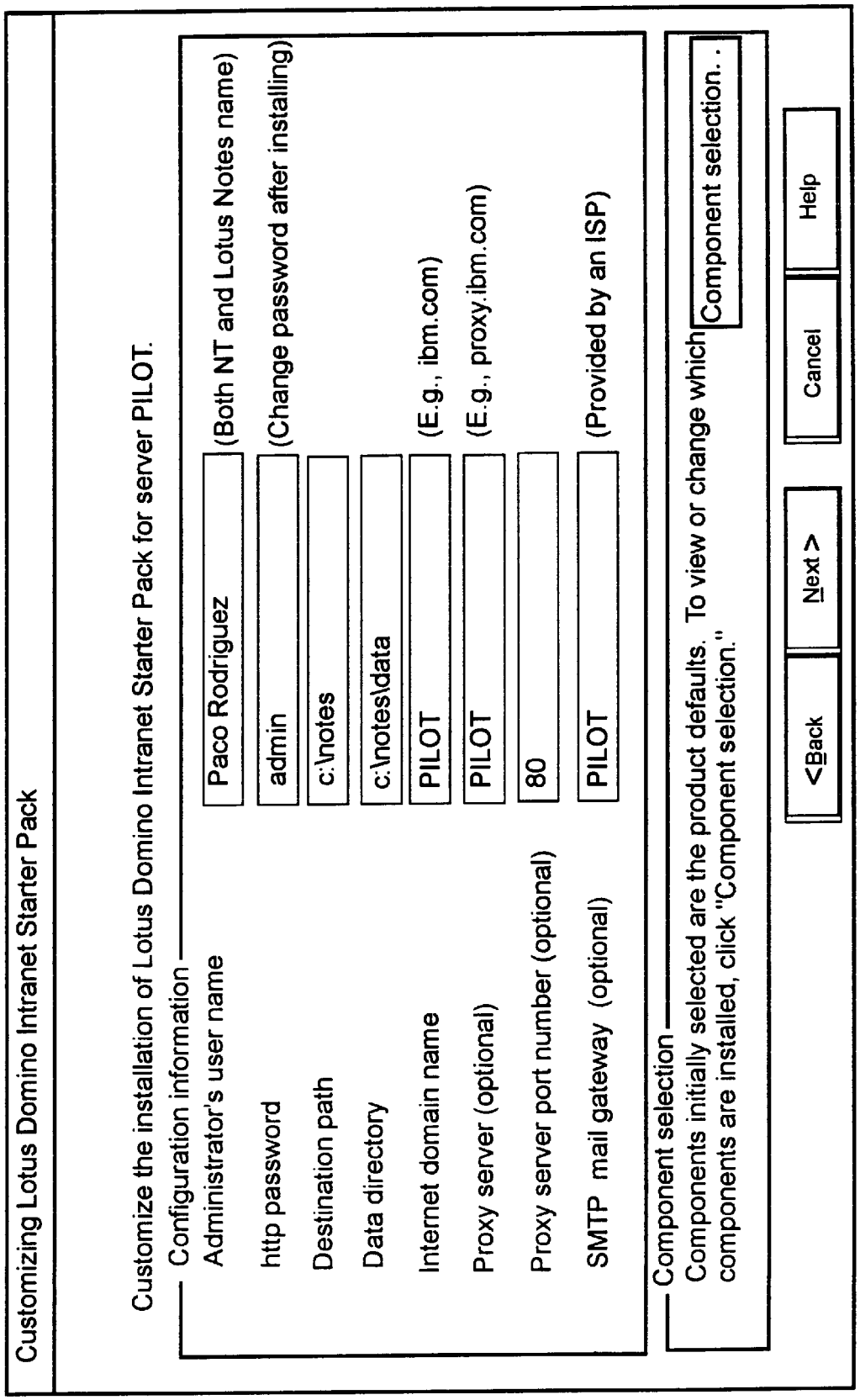
FIG. 10 is a diagrammatic view of an interactive dialog screen on the primary server for the entry of settings for the primary server.
Figure 11:
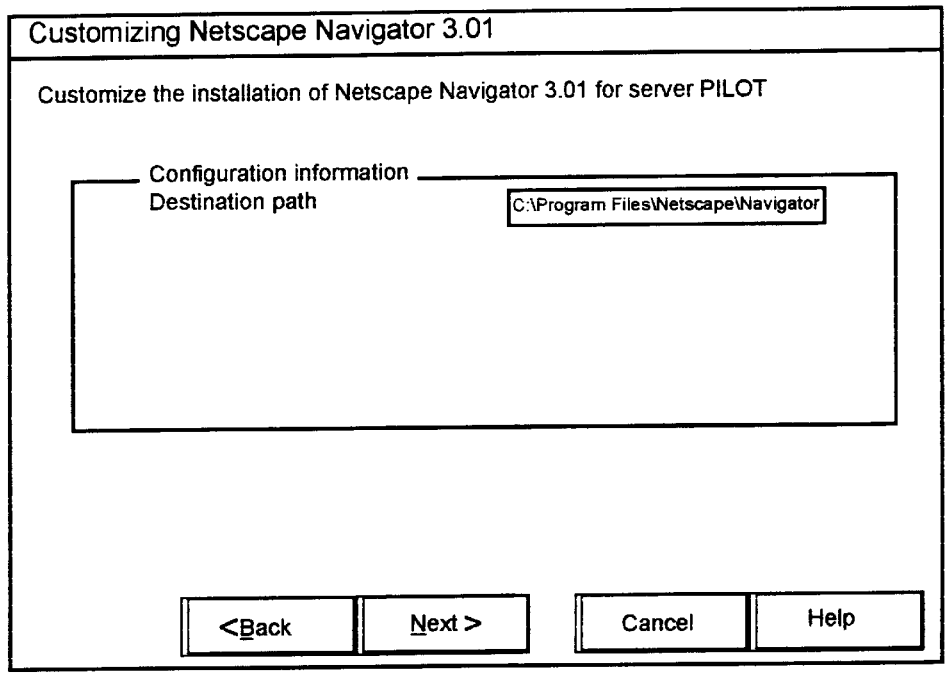
FIG. 11 is a diagrammatic view of an interactive dialog screen on the primary server for the entry of customized settings for an application to be installed on the primary server.
Figure 12:
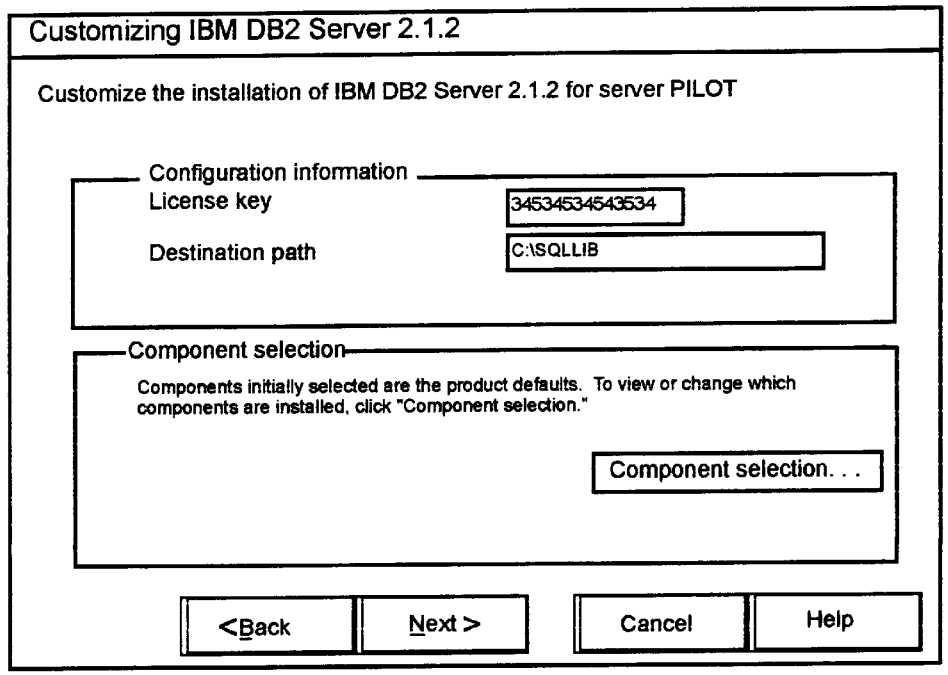
FIG. 12 is a diagrammatic view of an interactive dialog screen on the primary server for the entry of customized settings for another application to be installed on the primary server.
Figure 13:
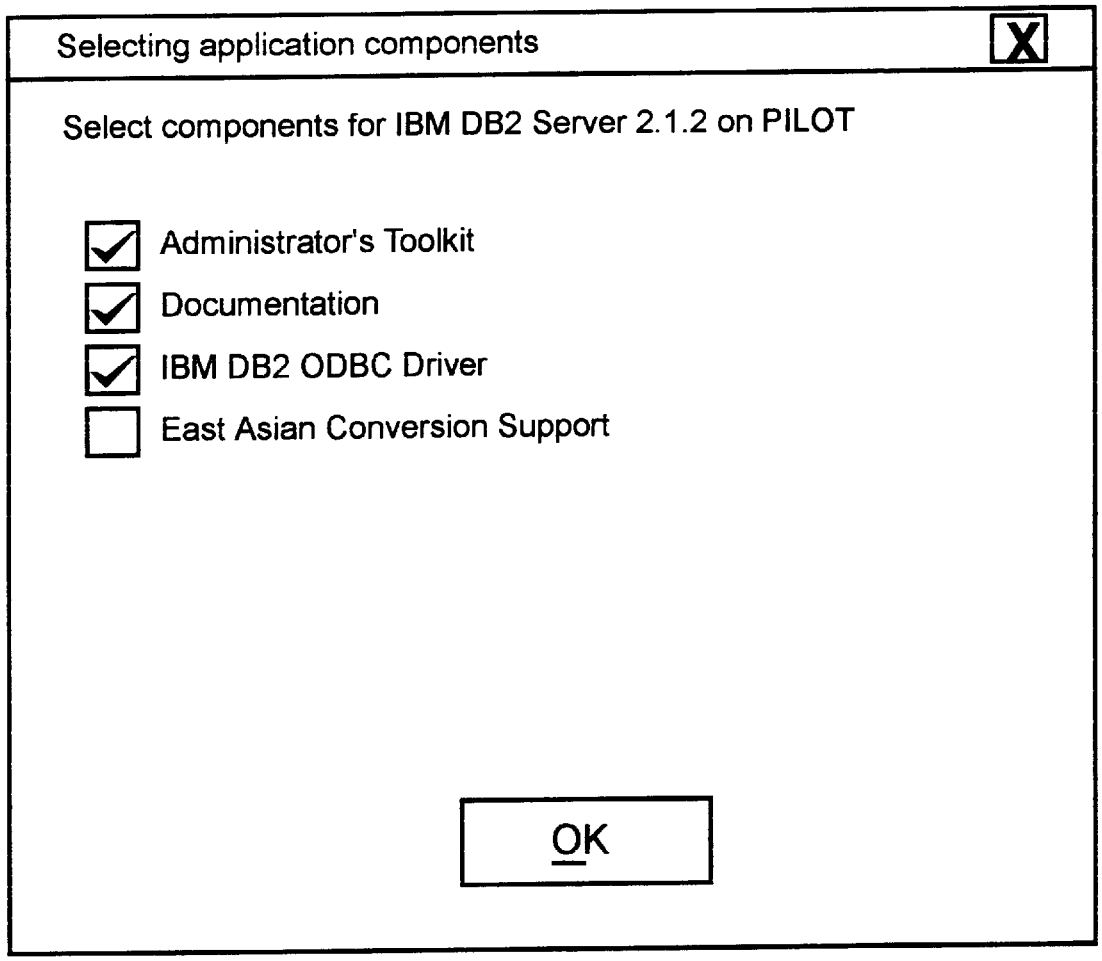
FIG. 13 is a diagrammatic view of an interactive dialog screen on the primary server for the entry of a component of the application entered via FIG. 12.
Figure 14:
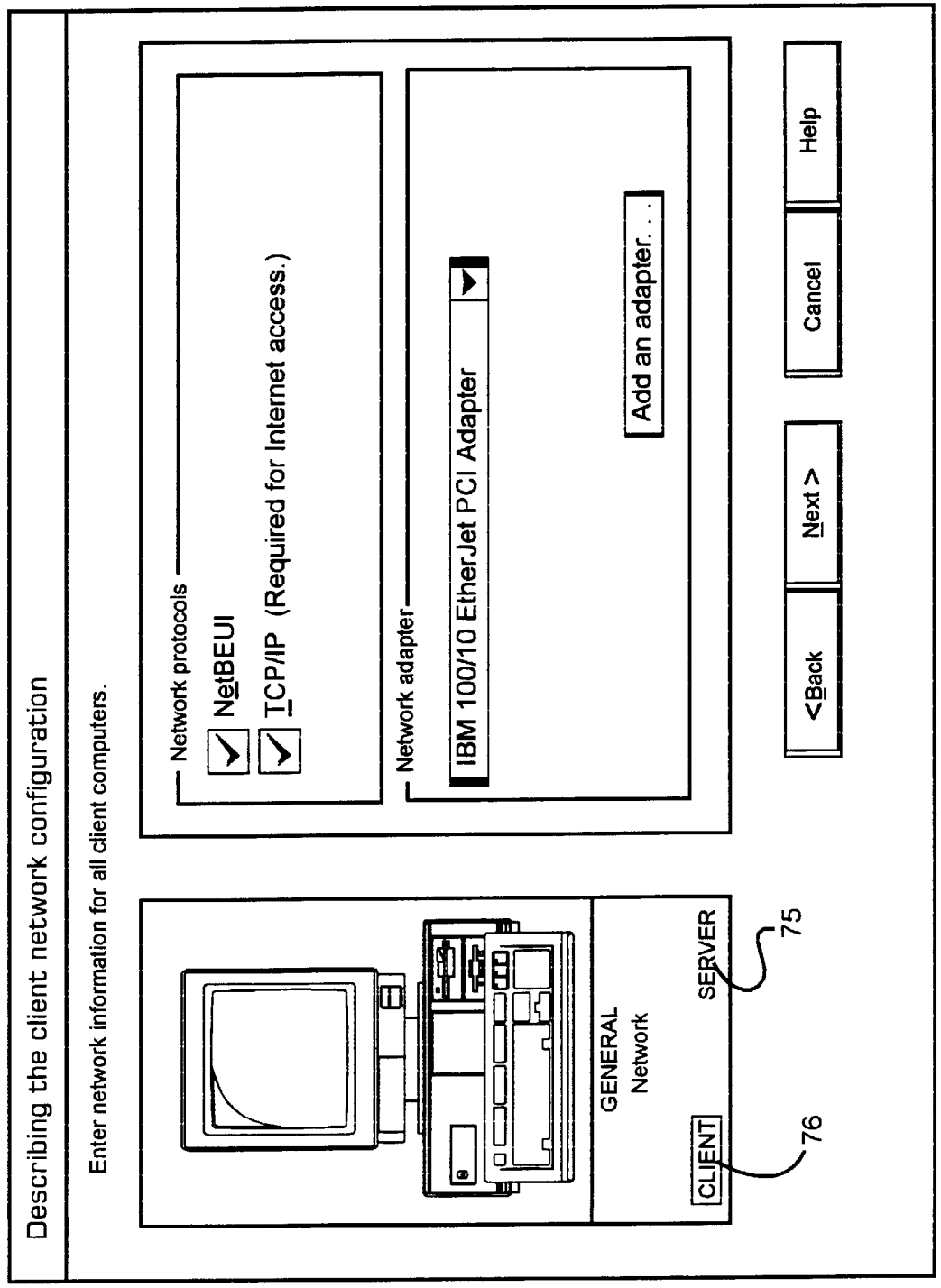
FIG. 14 is a diagrammatic view of an interactive dialog screen on the primary server for the entry of selections of the network protocols for all client computers in the network.
Figure 15:
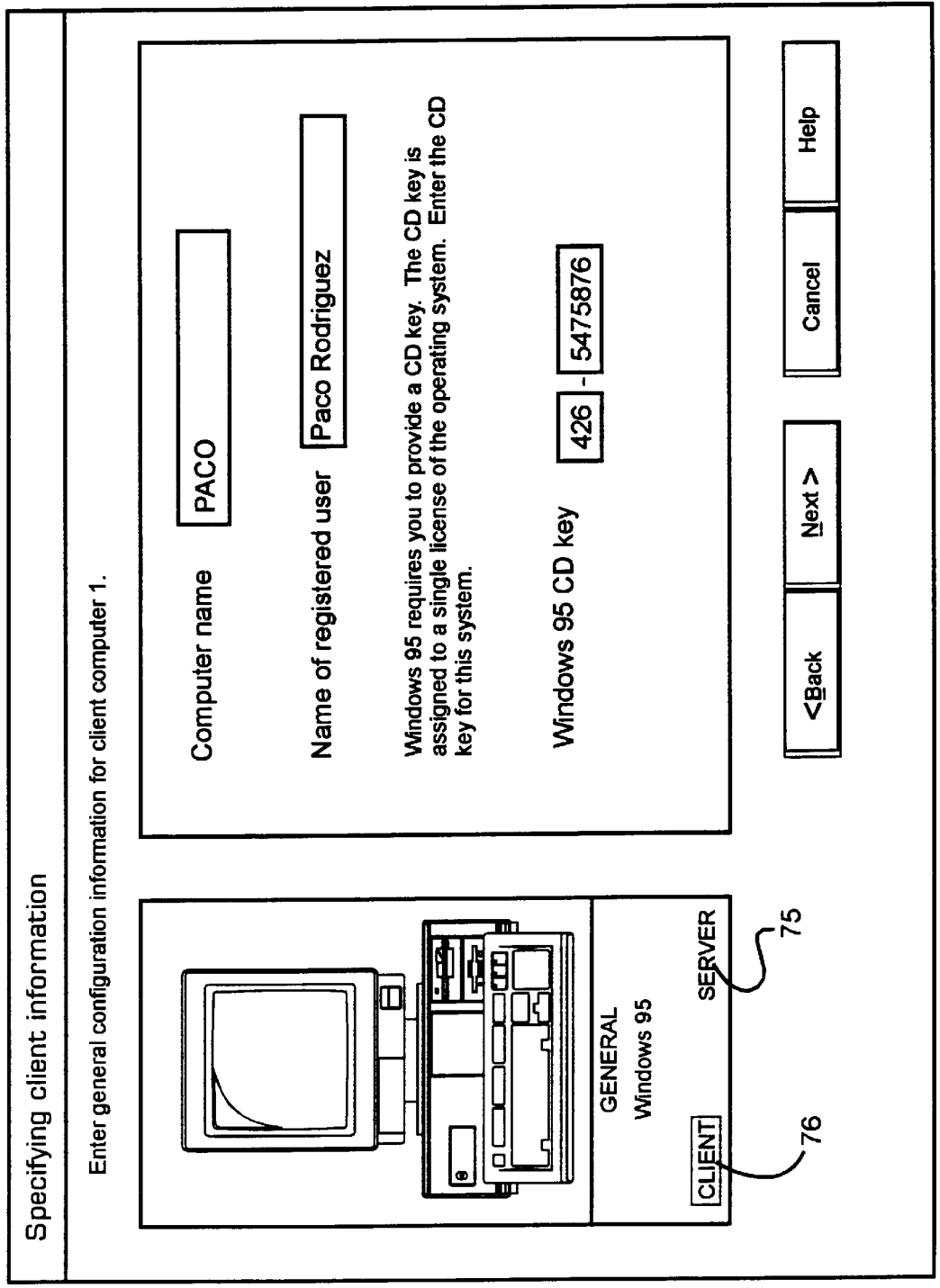
FIG. 15 is a diagrammatic view of an interactive dialog screen on the primary server for the entry of selected data specific to a first client computer in the network.
Figure 16:
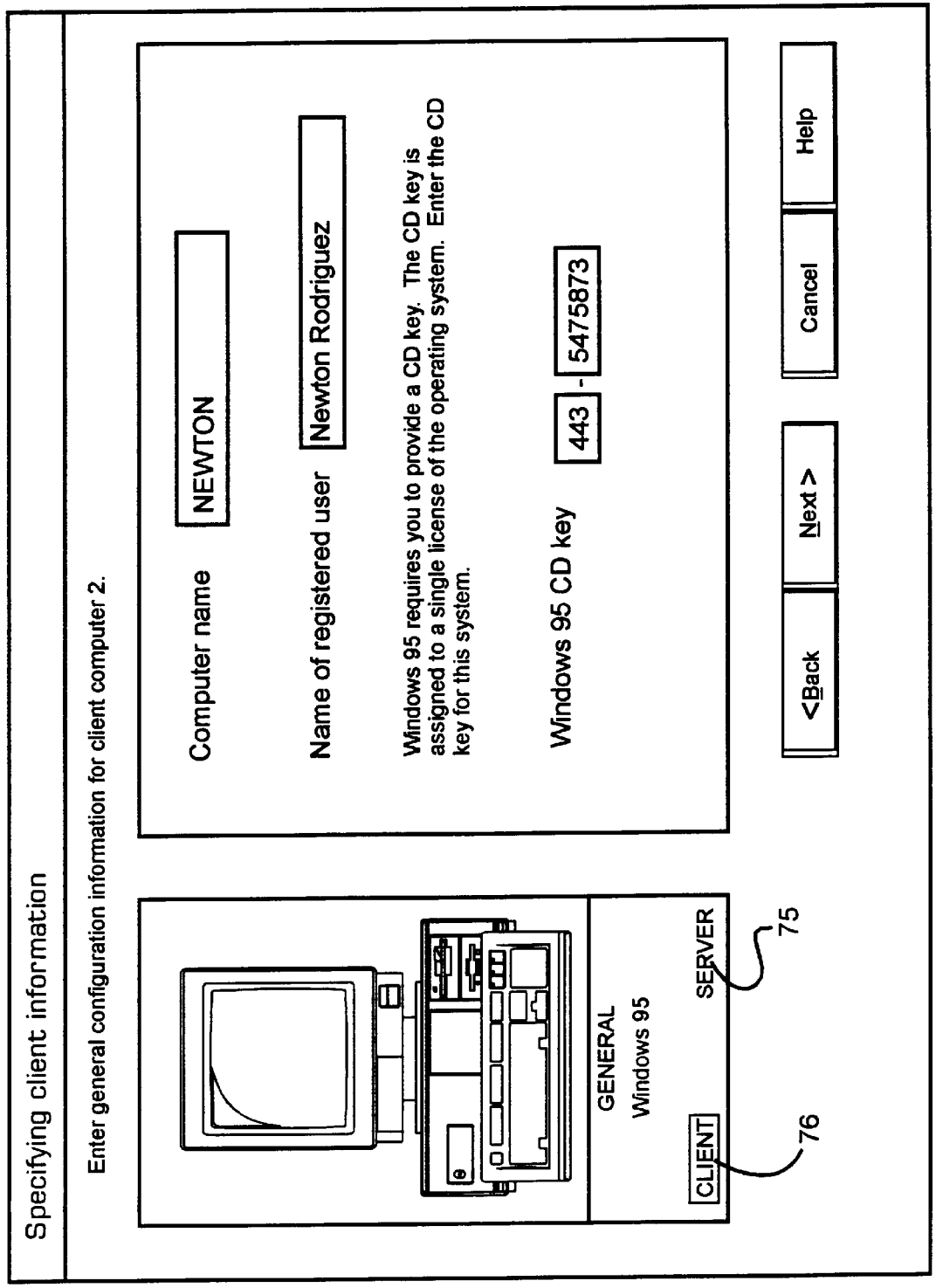
FIG. 16 is a diagrammatic view of an interactive dialog screen on the primary server for the entry of selected data specific to a second client computer in the network.
Figure 17:
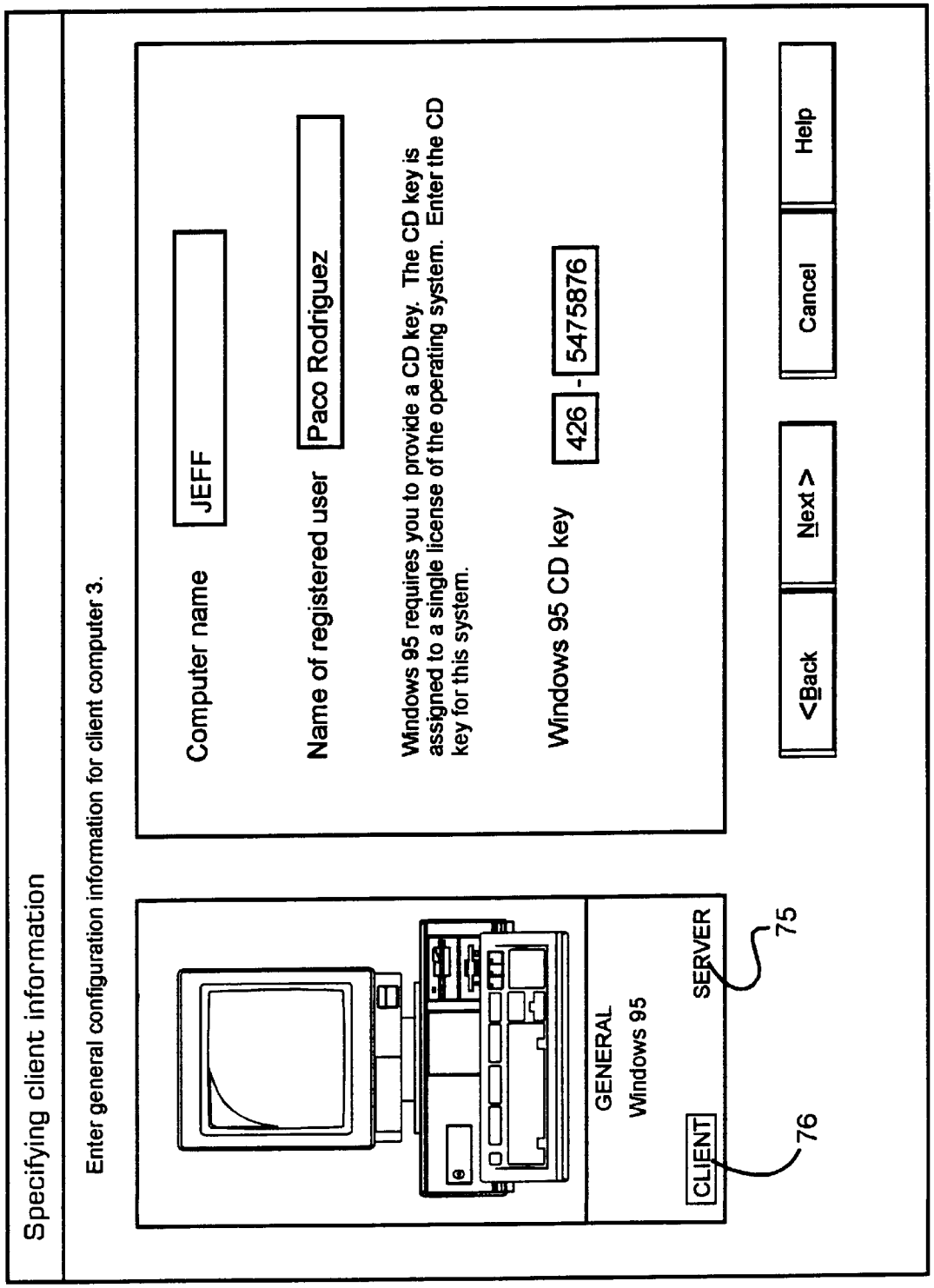
FIG. 17 is a diagrammatic view of an interactive dialog screen on the primary server for the entry of selected data specific to a third client computer in the network.
Figure 18:
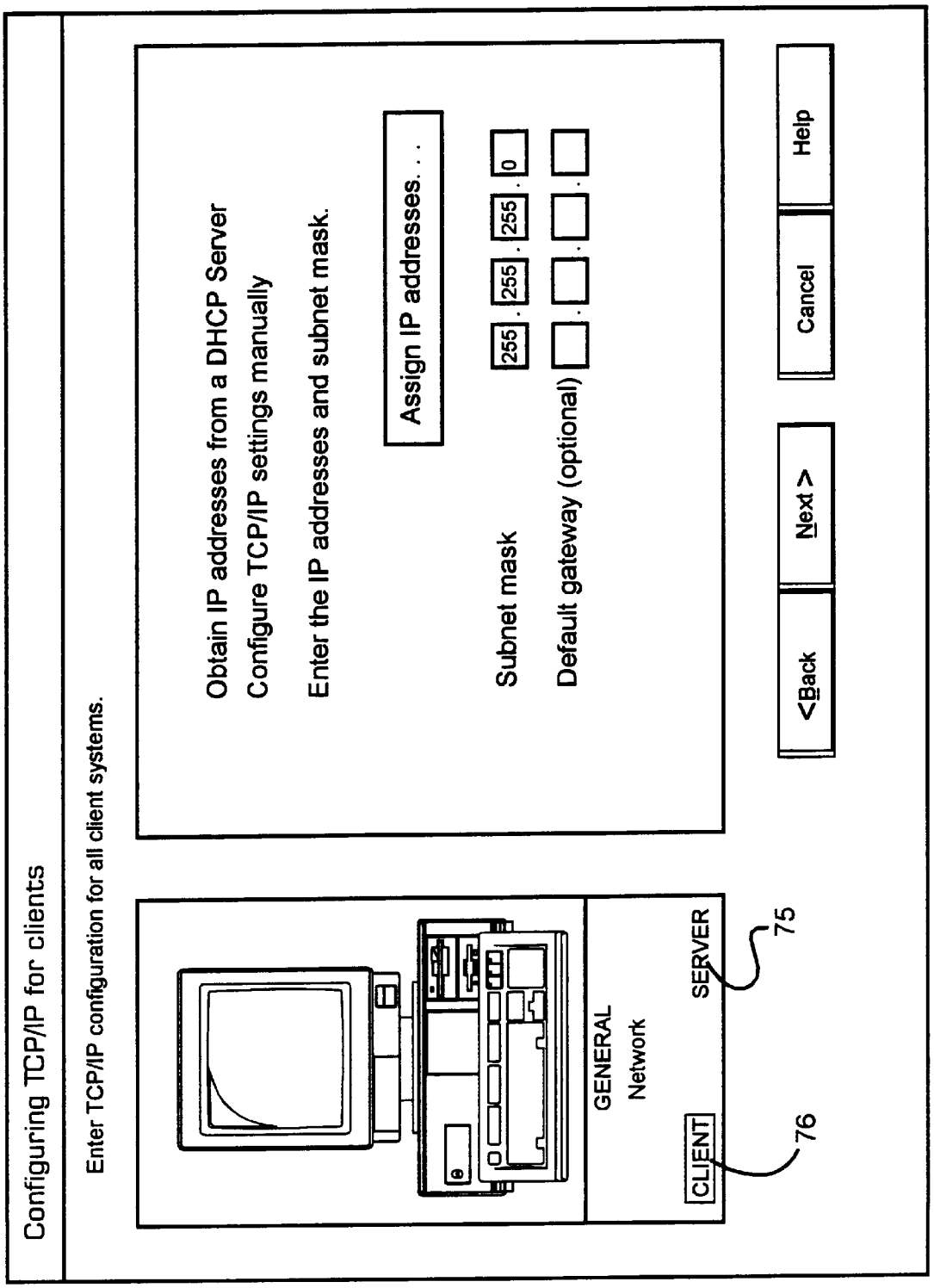
FIG. 18 is a diagrammatic view of an interactive dialog screen on the primary server for the entry of TCP/IP network related configurations for all client computers.
Figure 19:
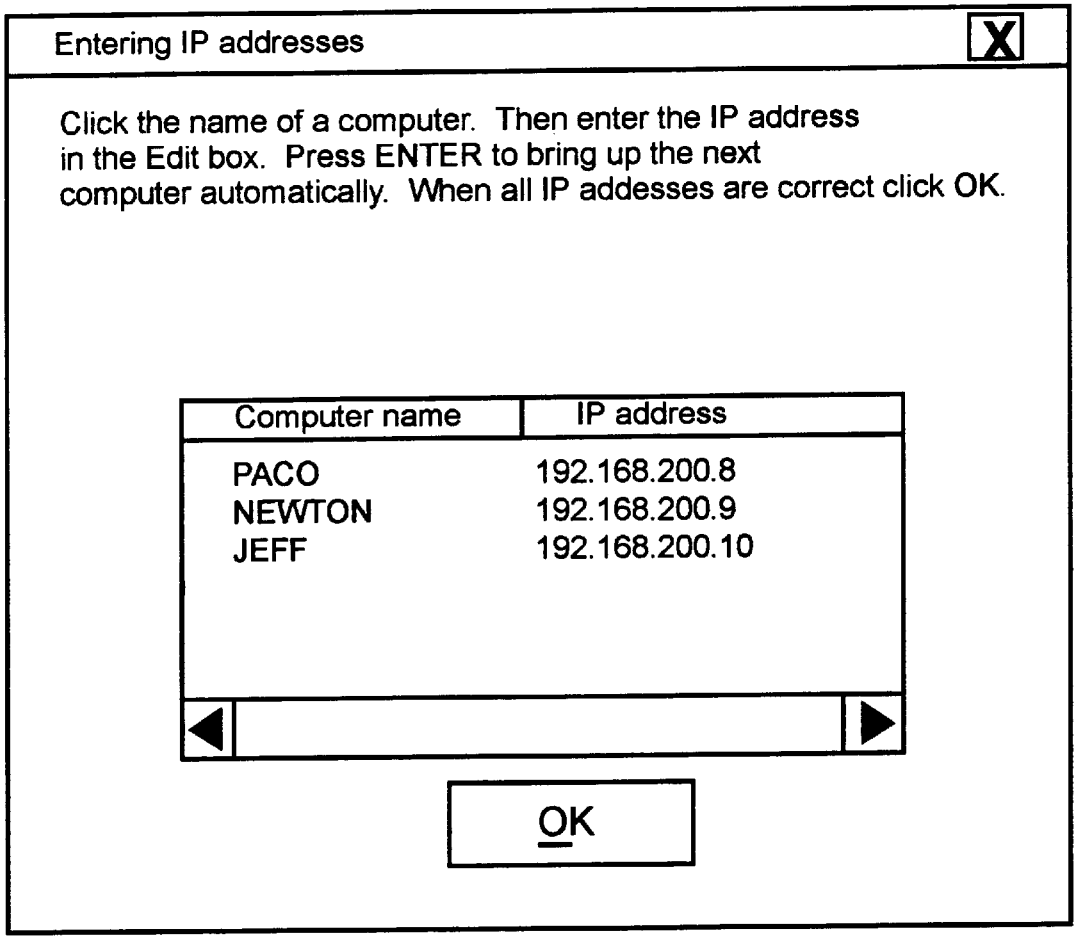
FIG. 19 is a diagrammatic view of an interactive dialog screen on the primary server for the entry of IP addresses for three client computers.
Figure 20:
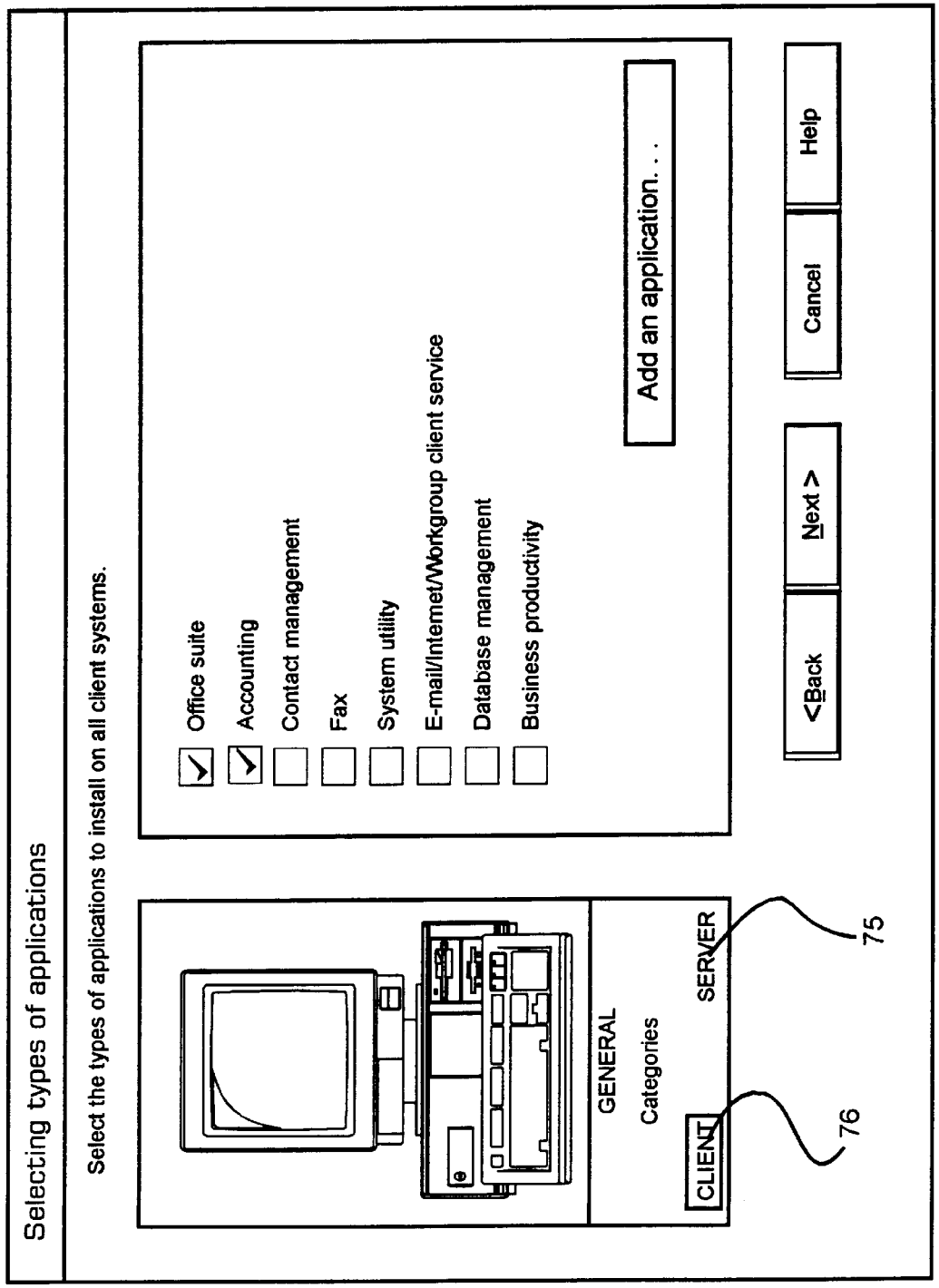
FIG. 20 is a diagrammatic view of an interactive dialog screen on the primary server for the entry of application programs to be installed on all client computers.
Figure 21:
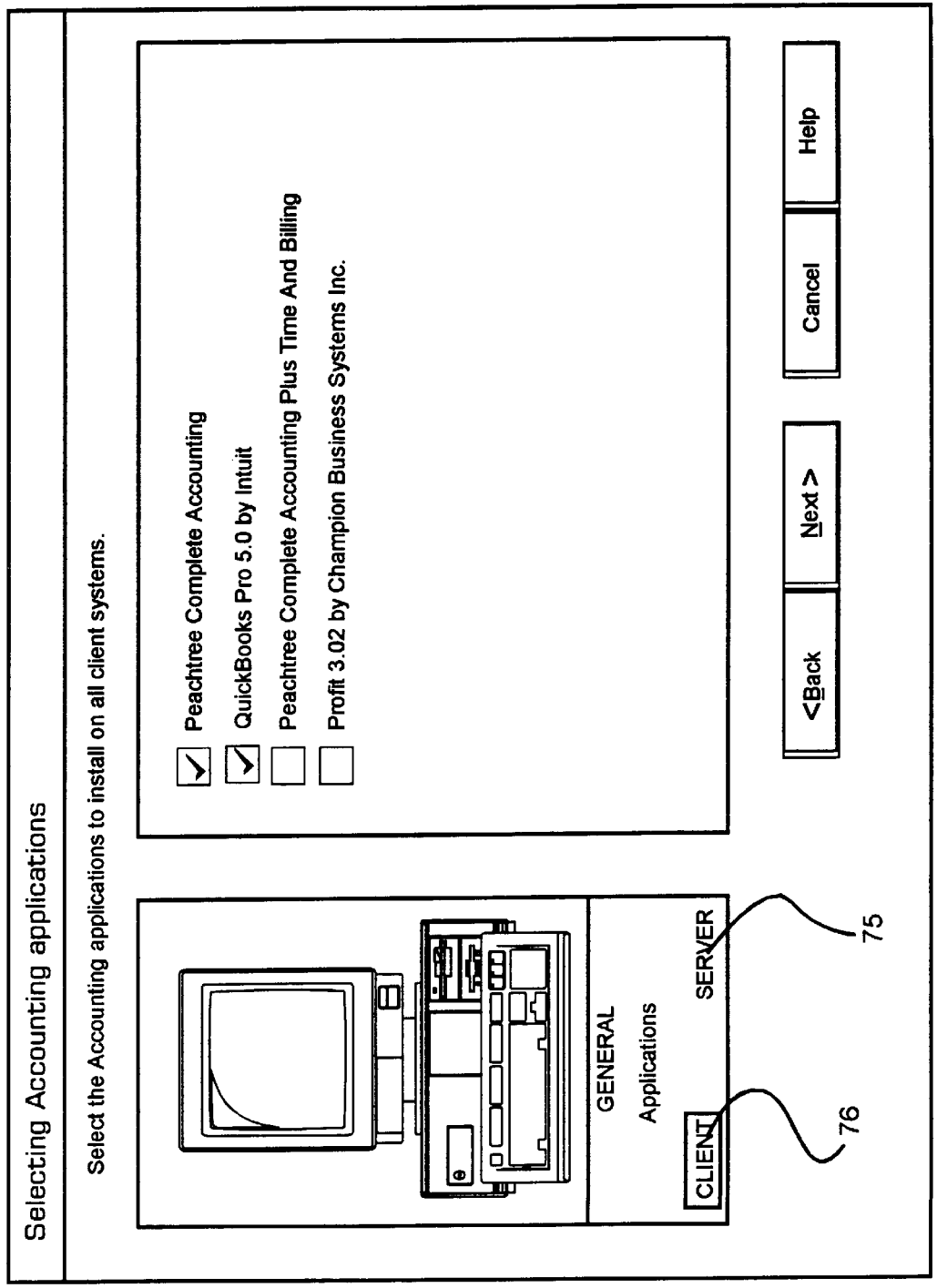
FIG. 21 is a diagrammatic view of an interactive dialog screen on the primary server for the entry of an accounting application program to be installed on all client computers.

The initial display screen of FIG. 3 shows the introductory screen of the system on display of the primary server. It explains the present system, as well as the aspects of the system covered in the above-referenced copending patent applications. It should be noted that although the present invention is applicable and has been used on networks having a plurality of server computers, each with its plurality of client computers, for convenience and conciseness in our illustration, the screen panels which follow will give the data entries for a portion of the network involving a server computer with several client computers. The screen of FIG. 4 asks the user to indicate whether the network installation is a new (from scratch) configuration or a modification of an existing network configuration. Selection 71 indicates a new configuration. Selection 71 is stored in the primary server. FIG. 5 merely shows the screen which would have come up if the user chose to modify an existing network configuration. Since a new configuration was chosen, the screen of FIG. 6 comes up and the user enters all of his keystroke and cursor selections, all of which are recorded in the primary server. It should be noted that with his selected entries, 72 through 74, the user has chosen to install the same operating system for all clients, the same applications for all servers and the same applications for all clients. This should significantly reduce the subsequent entry strokes and cursor selections which need be recorded since the same entry may be recorded and subsequently used for the multiple installations of the same applications. Then the screen of FIG. 7 solicits entries for setting up the desktop display environment for all of the client computers after which the screen of FIG. 8 asks for networking configurations for the server computers, such as e-mail groups, Internet workgroups and browser applications. Note that on the screen panel the server indicator 75 is highlighted to show that the entries are applicable to the servers. In any event, all keystroke and cursor selection entries continue to be made into and stored in the primary server 50, FIG. 1. Next, through the screen in FIG. 9, entries selecting database management system for the servers are made. Then, through the display screen of FIG. 10, Internet functions and settings are customized for one of the servers, "Pilot", which is the primary server. Then, through screen panels displayed in FIGS. 12 and 13, the network browser application: "Navigator 3.01" and the database management applications, respectively, previously selected for the primary server "Pilot" are customized. Next, FIG. 13, database application components and drivers are selected for the primary server computer through input to the display screen. Then, through the display screen of FIG. 14, network protocols and adapters are selected for all of the client computers. Note that the client indicator 76 is now highlighted to show that the keystroke and cursor selection entries being captured are now applicable to the client computers. Now, through the display panel shown in FIG. 15, one of the client computers, "Paco", is being configured with client settings relative to the windows application to be installed on it. Other client computers, "Newton" and "Jeff", are likewise individually configured as shown respectively in FIGS. 16 and 17. Next, the screen of FIG. 18 shows the entries made to configure TCP/IP network functions for all clients. This brings up the dialog panel of FIG. 19 wherein the IP addresses may be entered or modified for all clients. Next, the screen of FIG. 20, applications to be installed on all client computers are selected and more such selections are made through the screen of FIG. 21.

The screen of FIG. 22 shows the complete profile as represented by all of the applications loaded into the primary server and all of the keystroke and cursor selection entries stored to configure a network made up of a primary server and three client computers. It should be obvious that similar profiles could have been developed for a network of several servers plus respective pluralities of client computers.

Figure 23:
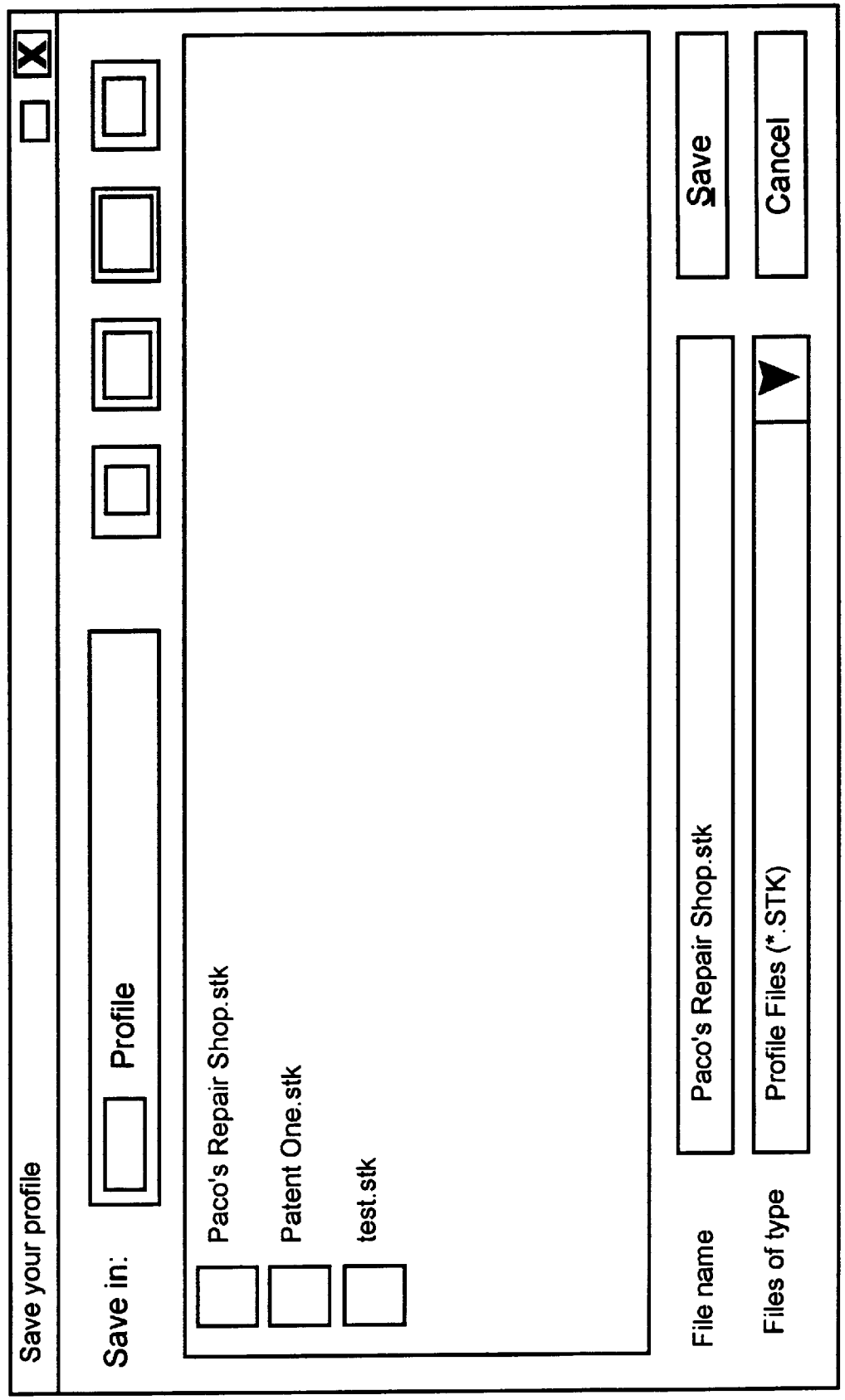
FIG. 23 is a diagrammatic view of an interactive dialog screen on the primary server for the entry of user data to save the profile of FIG. 22.
Figure 24:
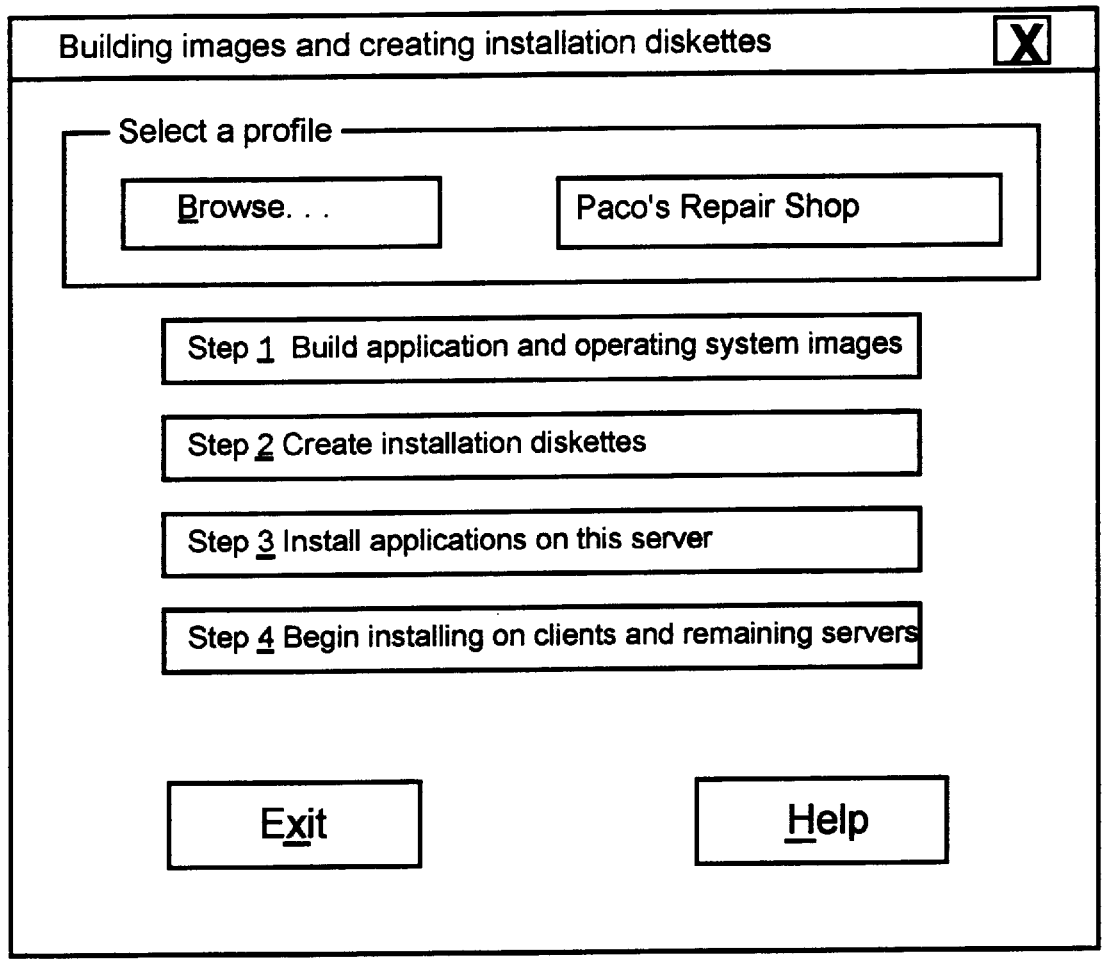
FIG. 24 is a diagrammatic view of an interactive dialog screen on the primary server for the overall entry of commands controlling the installation and the configuration of the network controlled by the entries described in this application.

FIG. 23 is the screen panel which is brought up after the user has reviewed the network profile of FIG. 22 to permit the user to save the profile. FIG. 24 is the screen dialog panel through which the user may use the entries described above for the subsequent installation and configuration of the network. This is described in greater detail in the above-referenced copending patent applications.

Figure 25:
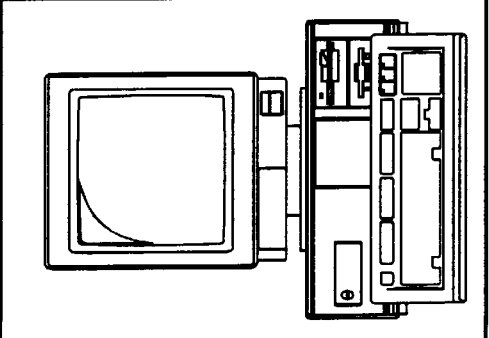
FIG. 25 is a diagrammatic view of an interactive dialog screen on the primary server for the initial entry of a new network configuration like that of FIG. 6 except that in the present configuration, each of the client computers respectively will have a different set of installed application programs.
Figure 26:
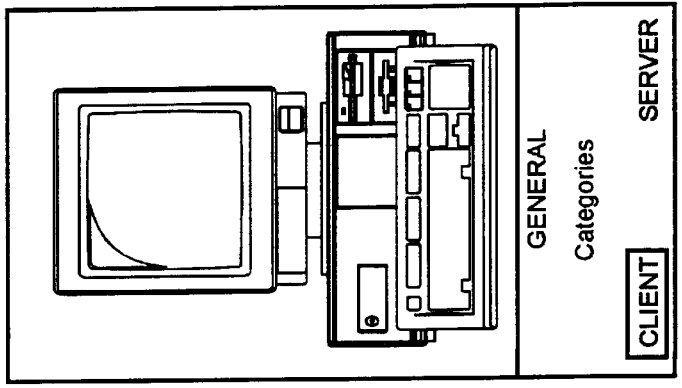
FIG. 26 is a diagrammatic view of an interactive dialog screen on the primary server for the entry of data selecting a set of application programs for a typical first client in the network of FIG. 25.
Figure 27:
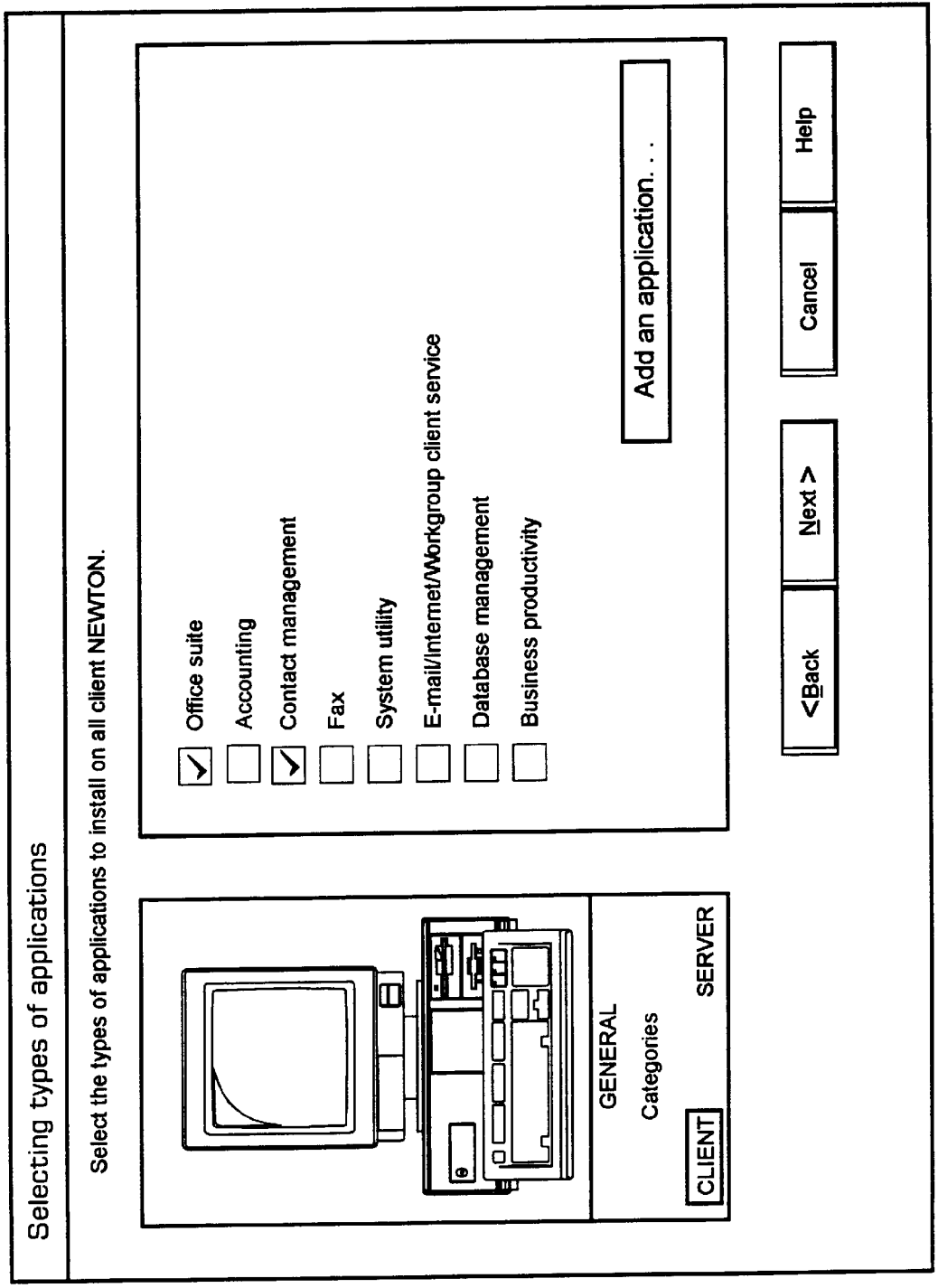
FIG. 27 is a diagrammatic view of an interactive dialog screen on the primary server for the entry of data selecting a set of application programs for a typical second client in the network of FIG. 25.

In this previous description, we have described the entries made in the configuration of a network which, for purpose of illustration, all of the same application programs were to be installed in all of the client computers. For purposes of completeness, we will now give an example of entries where different application programs are to be installed on different client computers. FIG. 25 is the screen panel of FIG. 6, except that the user has indicated by the absence of a selection in box 74 that the programs to be installed on all of the clients will not be the same for each client. This results in a sequence of individual selection panels as typified by the screen panels of FIGS. 26 and 27 each respectively for the client, "Paco", and the client, "Newton", which permits the user to make individual program and related selections unique to each client.

Figure 28:
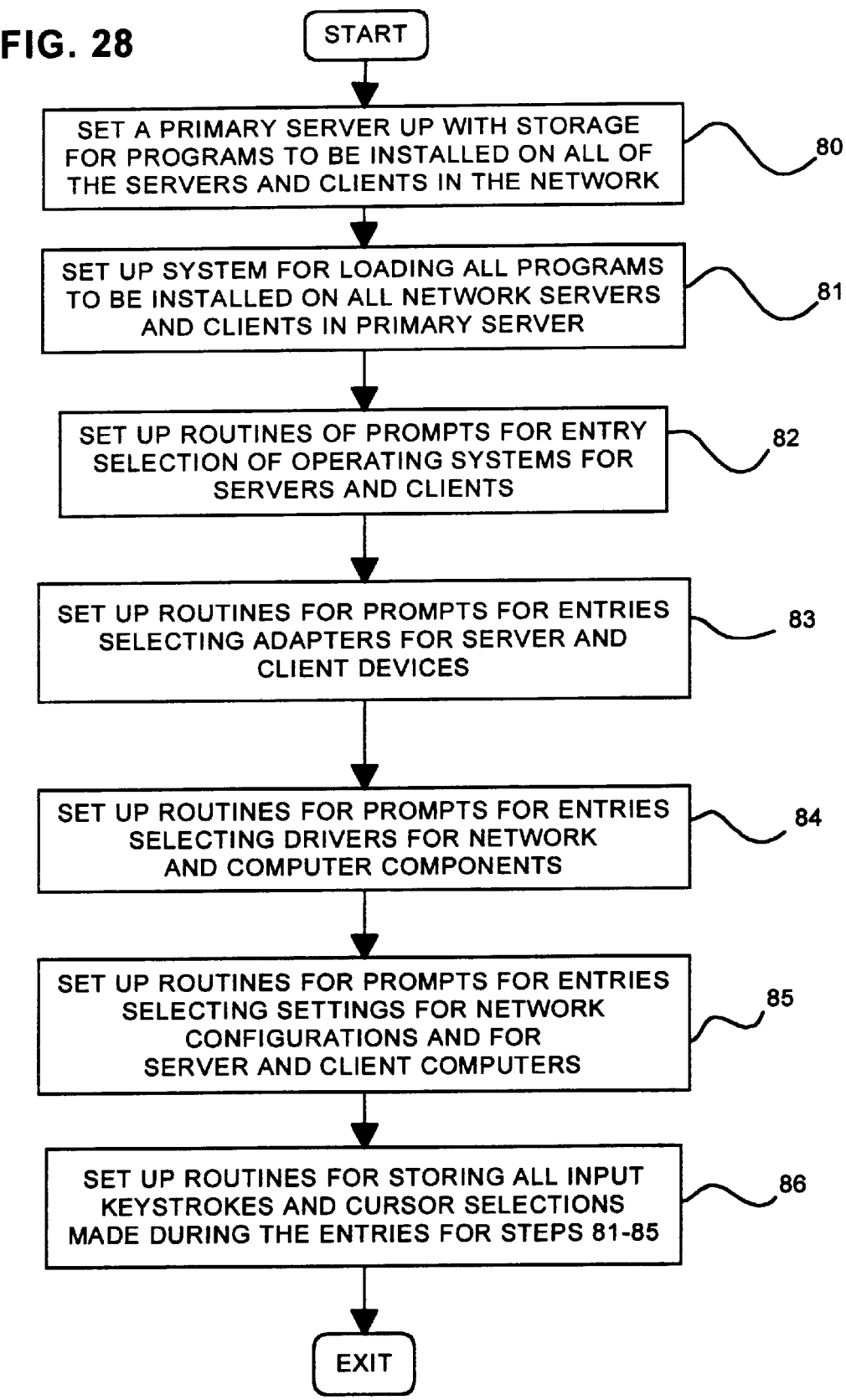
FIG. 28 is a flowchart of the basic elements of the program in the primary server computer which enables the primary server to control the data entry and network installation operations described with respect to FIGS. 3 through 27.

Now, with respect to FIG. 28, there will be generally described the basic elements of the program in the primary server computer which enables the primary server to control the data entry and network installation operations described with respect to FIGS. 3 through 27. Sufficient and readily accessible storage must be provided on the primary server for all of the programs to be subsequently installed for the whole network, step 80. A system is set up for initially loading into the primary server all of the programs to be subsequently installed in the network, step 81. Routines are set up in the primary server for the sequence of prompts described above for the entry of data relative to the selection of operating systems for the server and client computers, step 82. Routines are set up in the primary server for the sequence of prompts described above for the entry of data relative to the selection of adapters for the server and client computers, step 83. Routines are set up in the primary server for the sequence of prompts described above for the entry of data relative to the selection of drivers for network, server and client computer components, step 84. Routines are set up in the primary server for the sequence of prompts described above for the entry of data relative to the selection of settings for network configurations and for server and client computers, step 85. Finally, routines are set up for the capture and storage on the primary server of all of the keystroke and cursor selection entries described above with respect to FIGS. 3 through 27, step 86.

Figure 29A:
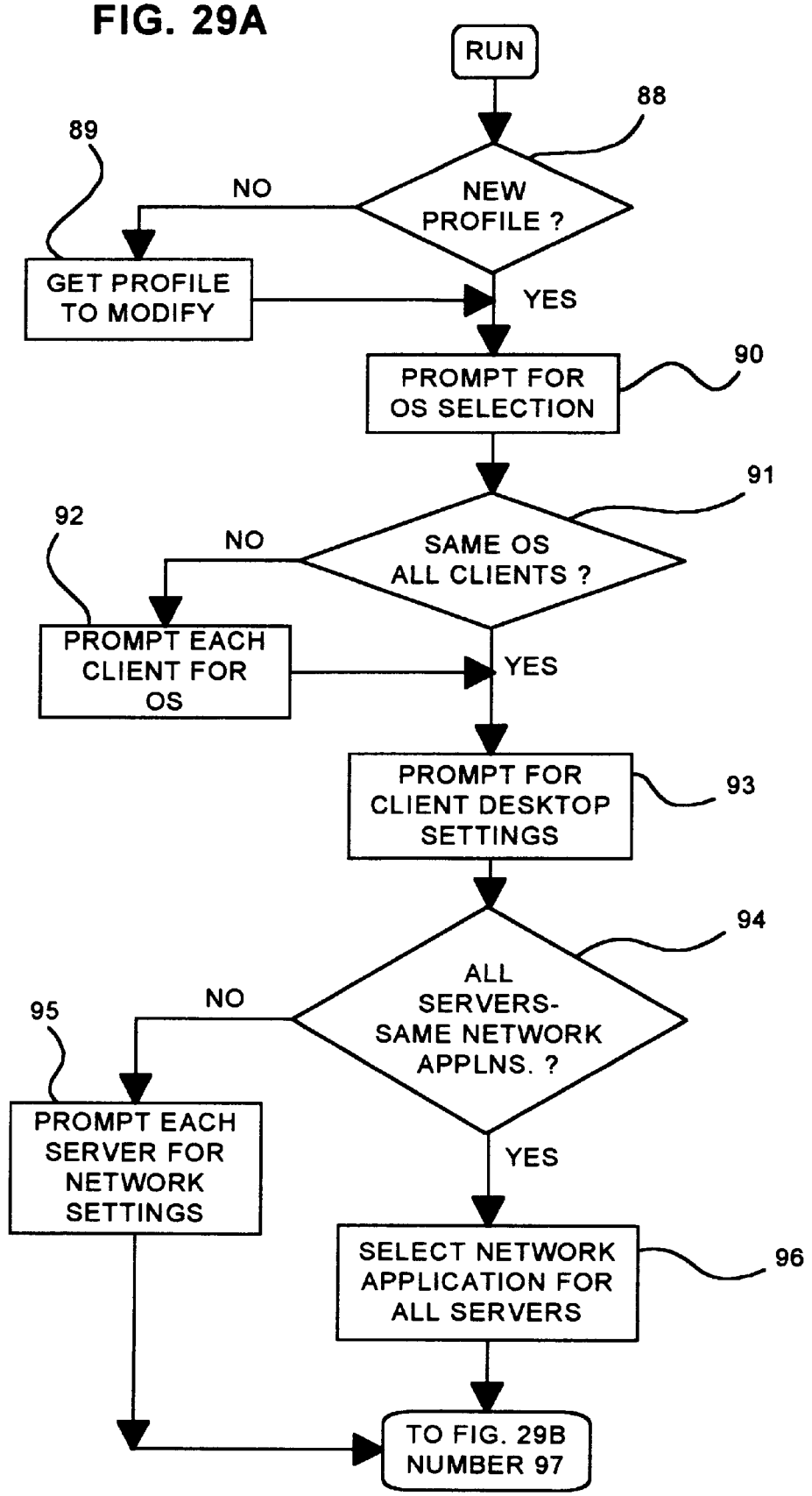
FIG. 29 is a flowchart of a simplified run of the program of FIG. 28.
Figure 29B:
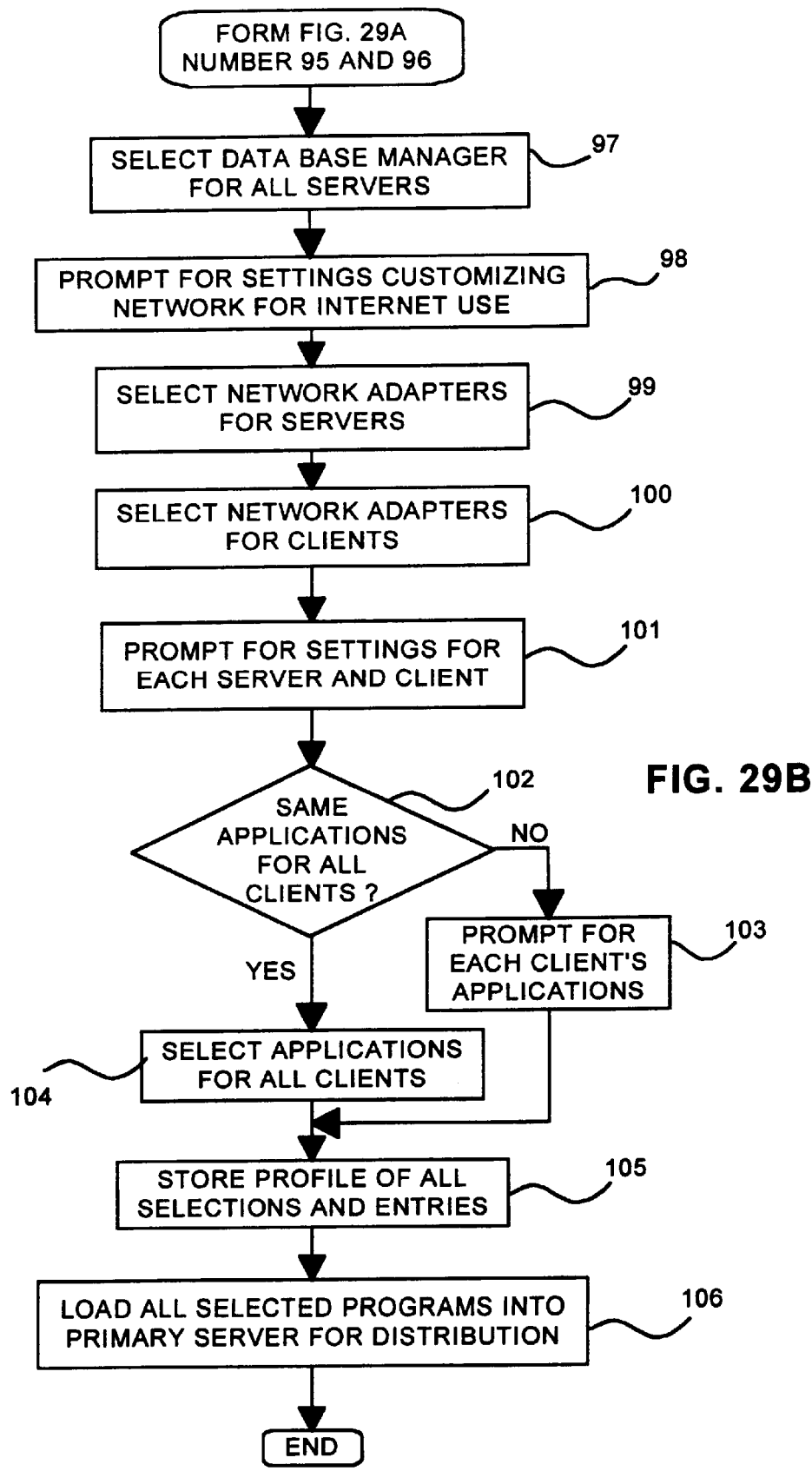

Now, with respect to FIG. 29, there will be described a modified program run to illustrate many of the steps involved in the prompts, data entries and storage of the entries described above for FIGS. 3 through 27. In this illustrative program run, not all of the possible combinations of data entries will be described. However, it should be readily understood how other selections and data entries discussed with respect to the present invention may be similarly prompted for, selected and stored. In the program run, an initial decision is made, step 88, as to whether an entirely new network configuration profile is to be developed. If not, then the configuration profile to be modified will be gotten, step 89. It should be noted that whether there is a configuration or a modification, the procedure is the same, except that only entries related to changes need to be made in modifications, while in new configurations, all entries should be made. Thus, in both new and modified configurations the system proceeds to step 90 where the user is prompted for an operating system selection and, step 91, where the user is asked whether this is for all clients. If No, then the program goes through a sequences of prompts, step 92, an individual prompt for each client. If Yes, then the selection made in step 91 applies to all clients and the program goes directly to step 93 where the user is prompted for desktop settings relative to the computers in the network. Then, the program moves to decision step 94 where the user decides whether all of the servers in the network are to have the same network applications. If No, then the program goes through a sequences of prompts, step 95, an individual prompt for each server to do its network application selection and settings. If Yes, then the selections made in step 96 apply to all servers and the program goes to step 97 where the user is prompted to select a database manager for all servers. Then, step 98, the user is prompted for settings customizing the network for Internet functions. The user is then prompted to select network adapters for both servers and clients, steps 99 and 100, and then prompted for a variety of general settings for all servers and clients, step 101. At this point, we come to the selection of the programming applications to be installed on the client computers in the network. Decision step 102 is where the user decides whether all of the clients in the network are to have the same application programs. If No, then the program goes through a sequence of prompts, step 103, an individual prompt for each client to do its application program selections. If Yes, then the selection of application programs made in step 104 applies to all clients and the program goes to step 105 where all entries in the form of the actual keystroke and cursor selections made in the running of this program are stored.

Also, all selected programs, whether they are for server or for client computers, are loaded into the primary server, step 106, for subsequent distribution to the appropriate servers and clients.

Although certain preferred embodiments have been shown and described, it will be understood that many changes and modifications may be made therein without departing from the scope and intent of the appended claims.

What is claimed is:

1. A method for the setting up of a network comprising at least one server computer and a respective plurality of client computers connected to each server computer, including steps of:

predetermining components, and application programs to be supported by each of said server and client computers in said network in said network configuration, designating one server computer having an interactive display interface to function as primary server computer, and controlling installation of said application programs and other programs which may be required to support said components through entries to said interactive display interface of said primary server computer.

2. The method of claim 1 wherein said at least one server computer is a plurality of server computers.

3. The method of claim 2 further including a step of controlling installation of operating systems for said server and client computers through entries to said interactive display interface.

4. The method of claim 3 further including a step of selecting adapters used to support components for said server and client computers through entries to said interactive display interface.

5. The method of claim 3 further including a step of selecting network adapters for said server and client computers through entries to said interactive display interface.

6. The method of claim 3 wherein said operating systems are installed from said primary server computer.

7. The method of claim 2 wherein said step of controlling installation further includes entering settings for said components and programs.

8. The method of claim 1 wherein the same programs to be installed on a plurality of client computers or server computers may be controlled through concurrent entries to said interactive display interface.

9. The method of claim 1 further including a step of storing said entries to said interactive display interface in said primary server computer.

10. The method of claim 1 wherein said application programs are installed from said primary server computer.

11. A computer program having program code included on a computer readable medium for the setting up of a computer network comprising at least one server computer and a respective plurality of client computers connected to each server computer, comprising:

means for designating one server computer having an interactive display interface to function as the primary server computer, means for determining the components, and the application programs to be supported by each of said server and client computers in said network, and means for controlling the installation of said application programs and other programs which may be required to support said components through entries to said interactive display interface of said primary server computer.

12. The computer program of claim 11 wherein said at least one server computer is a plurality of server computers.

13. The computer program of claim 12 further including means for controlling installation of operating systems for said server and client computers through entries to said interactive display interface.

14. The computer program of claim 13 further including means for selecting network adapters for said server and client computers through entries to said interactive display interface.

15. The computer program of claim 13 wherein said operating systems are installed from said primary server computer.

16. The computer program of claim 12 further including means for selecting adapters used to support components for said server and client computers through entries to said interactive display interface.

17. The computer program of claim 12 wherein said means for installing further includes means for entering settings for said components and programs.

18. The computer program of claim 11 wherein the same programs to be in stalled on a plurality of client computers or server computers may be controlled by concurrent entries to said interactive display interface.

19. The computer program of claim 11 further including means for storing entries to said interactive display interface in said primary server computer.

20. The computer program of claim 11 wherein said application programs are installed from said primary server computer.

* * * * *